United States Patent [19]

Rogers et al.

[11] Patent Number: 5,480,062

[45] Date of Patent: Jan. 2, 1996

[54] VACUUM OPERATED MEDICINE DISPENSER

[75] Inventors: Lisa W. Rogers; Thomas L. Kraft; John F. Berry; Scott A. Kelley; John A. Thompson, III, all of Houston; Clifford D. Ober, Missouri City; Michael C. Kuchar, Houston; Robert R. Mayer, Jr., Sugar Land; Van W. Hoskins, Friendswood; Vincent C. Weido, Houston; Mark G. Henckel, Katy, all of Tex.

[73] Assignee: KVM Technologies, Inc., Houston, Tex.

[21] Appl. No.: 380,124

[22] Filed: Jan. 30, 1995

Related U.S. Application Data

[60] Division of Ser. No. 162,810, Dec. 6, 1993, Pat. No. 5,405,048, which is a continuation-in-part of Ser. No. 80,807, Jun. 22, 1993, abandoned.

[51] Int. Cl.⁶ .............................. B65G 59/04; B65H 3/08; G07F 11/16
[52] U.S. Cl. ..................... 221/174; 221/197; 221/211; 221/287
[58] Field of Search ................. 221/1, 2, 7, 9, 221/11, 17, 211, 65, 174, 197, 287; 206/44.12

[56] References Cited

U.S. PATENT DOCUMENTS 1,962,902  6/1934  Kunath ............................ 140/132
2,345,074  3/1944  Sargent et al. ..................... 221/174 X
5,280,845  1/1994  Leight .............................. 221/2

*Primary Examiner*—William E. Terrell
*Assistant Examiner*—Dean A. Reichard
*Attorney, Agent, or Firm*—Arnold, White & Durkee

[57] ABSTRACT

A vacuum operated system for individually dispensing items of oral solid medicine from bulk storage to a user, where the medicine is dispensed under computer control, and the quantity and type of medicine is selected in advance by the user. The invention includes medicine dispensing equipment and a computer that provides a user interface. A plurality of storage containers arranged in a rotatable carousel or a rectilinear array may contain various pharmaceutical articles, or various types, dosages, ages, and lot numbers of medicines. The storage containers may be easily refilled by inserting modular refill cartridges into the storage containers. After a user enters certain data into the computer, the invention aligns a universal vacuum probe with the storage container that contains the desired items. The universal vacuum probe is lowered to the desired storage container and engaged with a container probe that is exclusive to that storage container. After a vacuum source creates suction within the universal vacuum probe and the container probe, the universal vacuum probe and the container probe are operated to individually extract items from the storage container. In one embodiment, the extracted items are dispensed into a cup for retrieval by a user. In another embodiment, one or more items are packaged separately in an envelope, which is stored in a portable envelope-organizing tote along with other envelopes containing items requested by that user.

5 Claims, 30 Drawing Sheets

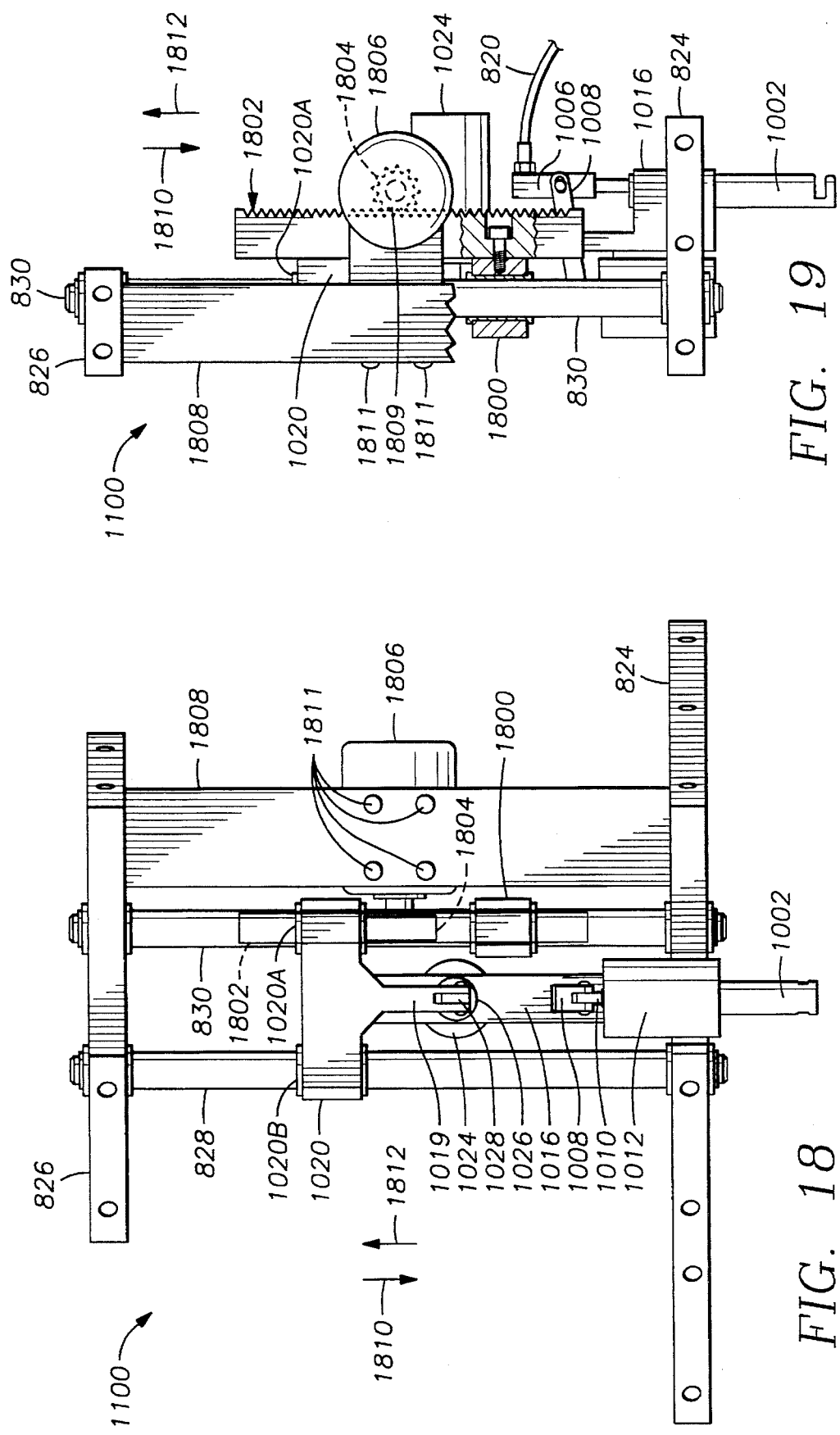

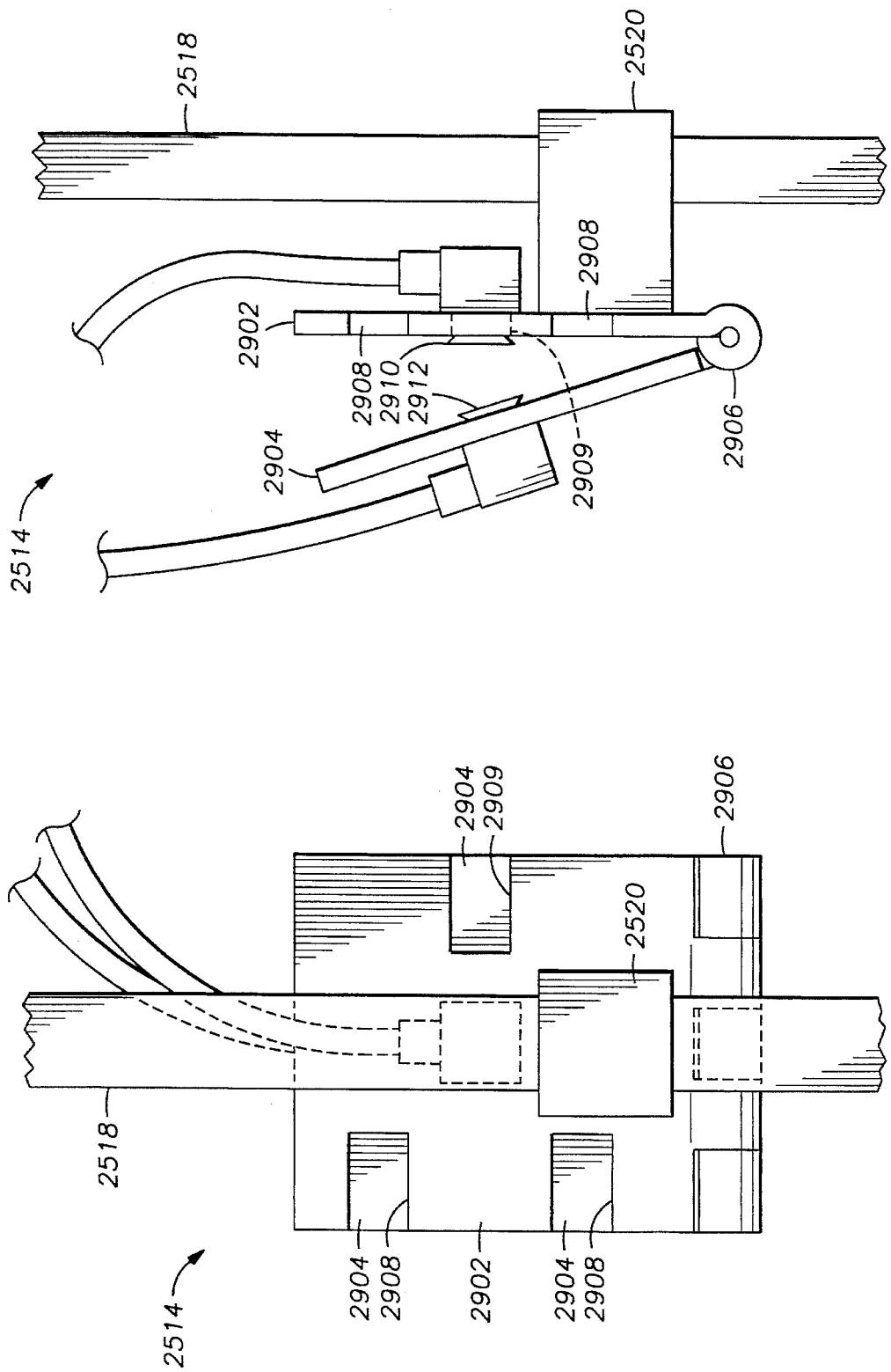

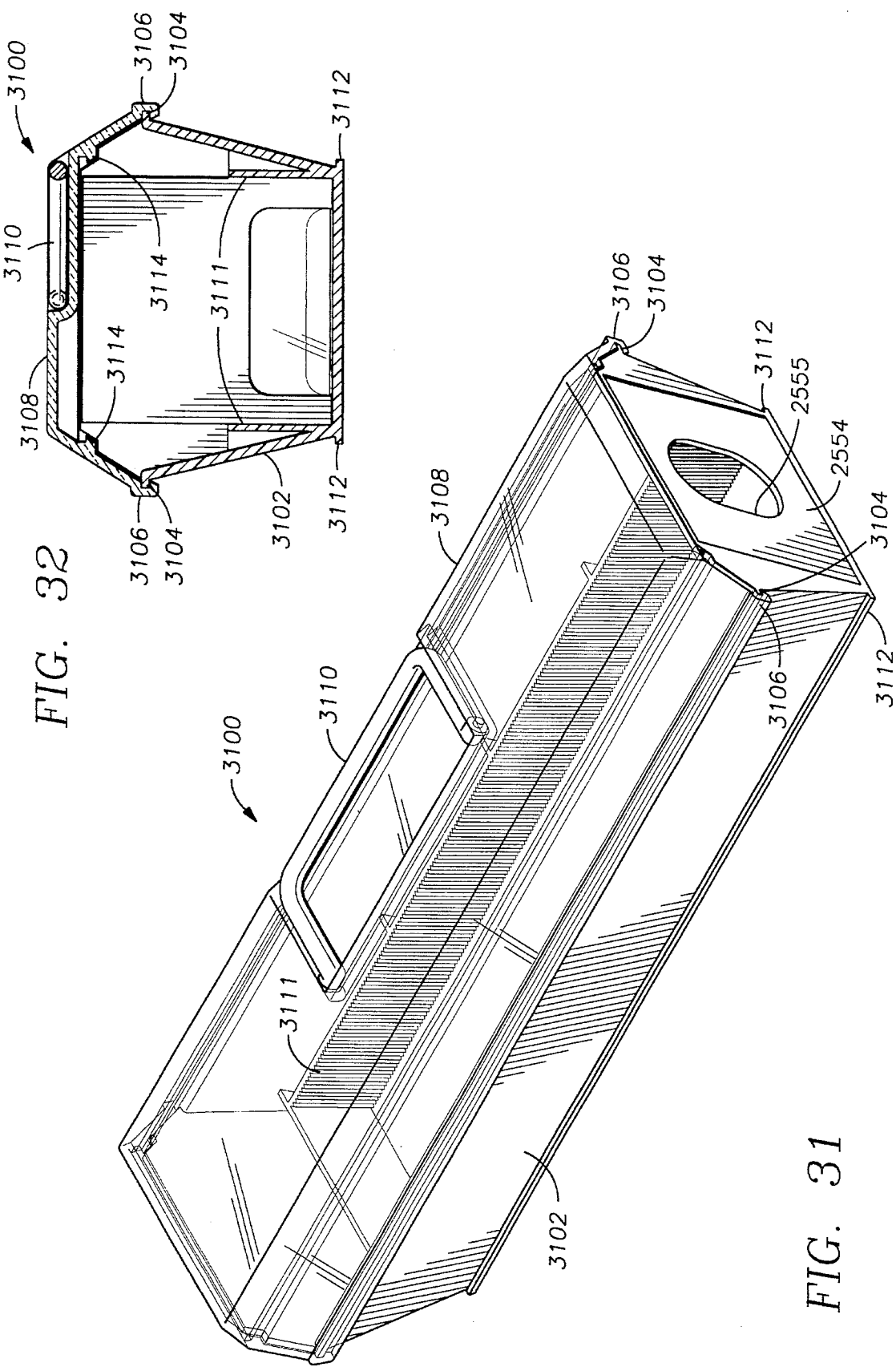

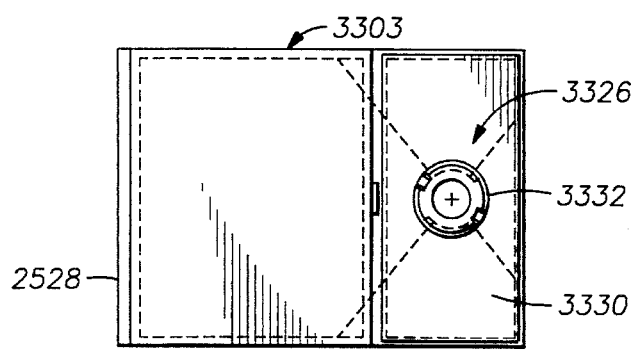
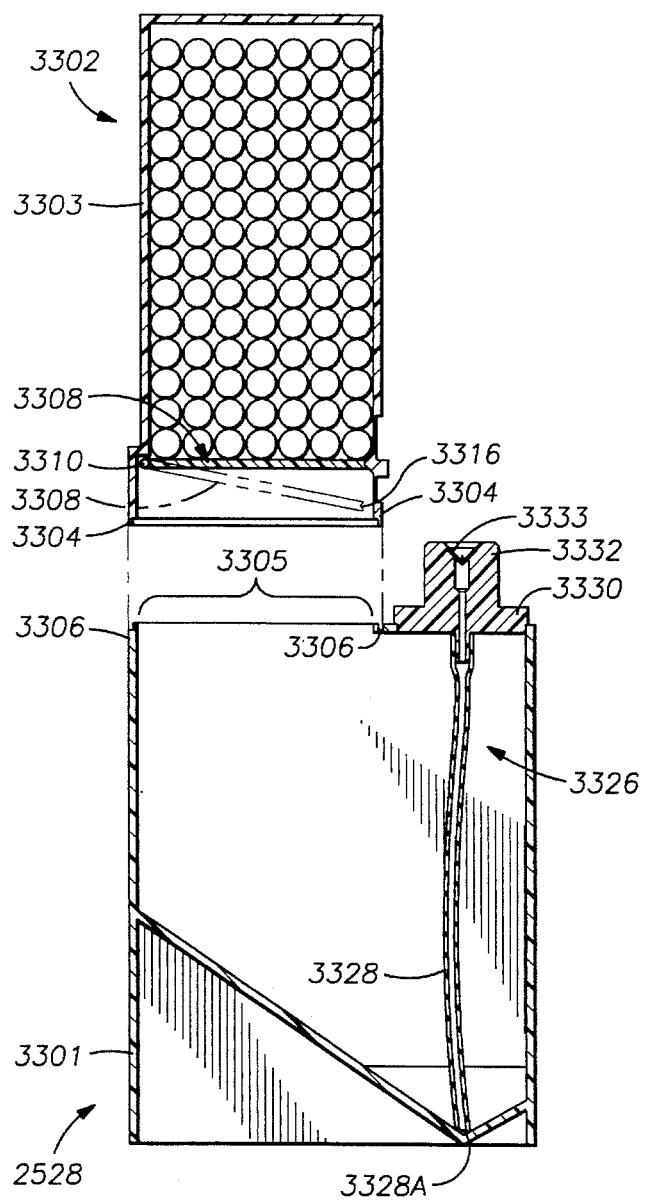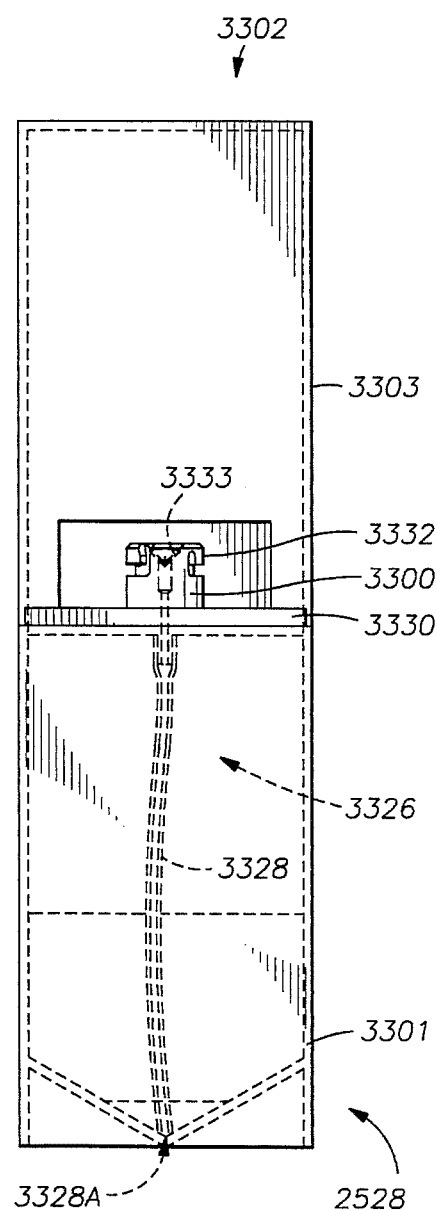
FIG. 34
FIG. 33
FIG. 35

VACUUM OPERATED MEDICINE DISPENSER

CROSS-REFERENCE TO RELATED APPLICATIONS

This application is a divisional of application Ser. No. 08/162,810 filed Dec. 6, 1993 now U.S. Pat. No. 5,405,048, which is a continuation-in-part of U.S. application Ser. No. 08/080,807, entitled "Vacuum Operated Medicine Dispenser", filed on Jun. 22, 1993 in the names of Rogers et al., now abandoned.

BACKGROUND OF INVENTION

1. Field of Invention

The present invention generally relates to machines for dispensing an accurate count of unit objects from a bulk storage location. More particularly, the invention concerns a vacuum operated system for accurately dispensing medicine or other pharmaceutical articles to a user such as a nurse, where the number or type of articles to be dispensed is selected by the user in advance, and where each article is dispensed individually from bulk storage under computer control.

2. Description of Related Art

In recent years, a number of systems have been designed to deliver medicine at locations such as nursing stations in hospitals. By providing an inventory of medicine at such locations, these systems have attempted to reduce the need for nurses or pharmacy personnel to repeatedly travel between the nursing station and the pharmacy to acquire medicine. These systems also seek to help management of medicine and control inventory more easily. Some examples of these systems include the Meditrol machine (made by Meditrol), the SureMed and ATC 212 machines (made by Baxter), and the Pyxis product line (made by Pyxis).

Although these systems have been adequate for their intended purposes in many respects, they are limited in other ways. Some of these systems store the articles to be dispensed in a small bin, and they provide a user with access to the articles in the bin by opening the bin in one way or another. One disadvantage of such systems is that monitoring the number of articles removed from a bin by a user is difficult, if not impossible, without relying on each user to honestly report the number of articles s/he removed.

Other of these systems approach this difficulty by providing a single "unit dose" package per compartment. "Unit dose" refers to packages containing a single item of medicine, typically bearing a printed identification of the medicine and a lot number. Unit dose packages may be undesirable to some, due to their significantly higher cost compared to bulk packages. Also, with one unit dose per bin, the packages must be loaded one at a time, thereby increasing the labor required to fill the bins.

As a result of these limitations, there has been a need for a system capable of individually retrieving items from a batch of like items stored in a bottle, bin, jar, or other bulk container, and making the retrieved items available to a user. One approach to this problem uses robotic equipment to manipulate a distinctive bottle, and drop a desired amount of medicine from the bottle into a packaging system for a patient's current or daily dose of medication. A potential problem with the robotic device that uses a distinctive bottle is that, for each bottle of medicine, a backup bottle must be accessible to avoid delays after the first bottle is emptied. However, the backup bottle cannot be "piggybacked" with the primary bottle due to the structure of the robotic device, and also due to the requirement that medications produced in different lots may not be mixed; accordingly, two spaces must be allocated for each different medicine provided by the device if stock-outs are to be avoided. This reduces the potential variety of medicines provided by the robotic device. Some might also consider the robotic machine to be limited because its bottles cannot be added to or "topped off," and therefore each bottle must be used until it is completely empty, and then manually replaced. As a result, the service schedule for the device is not as predictable as some might prefer, since each bottle must be serviced when its contents are depleted.

In contrast to the above-mentioned robotic system, other robotic systems have used vacuum arrangements to pick up small articles aided by a vision system of some type. For example, Seiko has employed a vacuum pick-up to lift watch hands from unordered batches to assist in assembling watches in an industrial environment. The Seiko system utilizes a vision system to control positioning of the vacuum pick-up. Although the Seiko system may be suitable for some applications, its benefits are limited when considered for dispensing medicine. For instance, the Seiko system only provides a single probe tip for vacuum pick-up of all parts. However, in dispensing medicine, the use of a probe tip must be limited to one specific type of medicine, to eliminate any possibility of cross-contamination from other medicines. The Seiko approach is also limited for dispensing medicine since a vision system capable of recognizing the wide variety of sizes, colors, and shapes of medicine would be unduly complicated. Moreover, the cost, size, and noise of the Seiko system is not appropriate for a hospital environment.

BRIEF SUMMARY OF INVENTION

The present invention generally involves a vacuum operated system for accurately dispensing medicine or other pharmaceutical articles from a bulk storage location to a user such as a nurse, where the articles are dispensed individually under computer control, and the number and type of articles are selected in advance by the user. More specifically, the invention concerns an apparatus for dispensing oral solid medicine and comprises a vacuum operated probe for retrieving an item of oral solid medicine from a bulk of such items, and a detector to measure a condition of the air downstream of the probe tip to determine whether the probe has retrieved a single item of oral solid medicine.

The invention includes dispensing equipment and a controller for the dispensing equipment, both contained in a housing. The invention also includes a computer to maintain records and provide a user interface. More specifically, the invention provides an apparatus for bulk storage of multiple items of oral solid medications. For example, a carousel or rectilinear array of individual storage containers may be provided. Retrieval of a desired number of items of oral solid medicine from a storage container or from multiple storage containers is accomplished by a vacuum probe system capable of retrieving unit articles from the respective storage containers. Cross-contamination is avoided by providing a probe system comprising a container probe extension associated with each storage container and a universal vacuum probe that is capable of engaging the probe extension associated with each storage container to withdraw unit oral solid medication articles from each storage container. In that fashion, only the container probe associated with each storage container contacts the medication within that storage container, and cross-contamination is avoided.

Generally, to dispense articles in accordance with a "cup-dispensing" embodiment of the invention, a user first inserts a cup into a cup door provided in the housing. A universal vacuum probe reciprocatingly engages a container probe held in a storage container that holds the desired medicine. The container probe is advanced further into the storage container, and a vacuum source creates suction through the container probe. The container probe is then used to individually remove one or more articles comprising the current dose from the storage container and deposit the articles in the cup. The user may then open the cup door, exposing the cup, to remove the cup containing the articles.

More particularly, in the cup-dispensing embodiment, the dispensing equipment of the invention includes a rotating carousel accessible through, for example, a drawer to facilitate re-stocking of the carousel. The carousel carries a plurality of storage containers, wherein each storage container may store a different type of pharmaceutical article, or a different composition, age, lot number, or dosage of medicine. In addition, each storage container is provided with a container probe that is to be uniquely associated with that storage container after the storage container is first filled with medicine. The carousel is rotated by a motor to align the universal vacuum probe with a desired, individual container probe. Each container probe includes a plug, which creates a seal between the container probe and the storage container when the container probe is dormant.

To dispense articles in accordance with an "envelope-dispensing" embodiment of the invention, an empty envelope is removed from a stock of empty envelopes in an envelope storage housing. The envelope is advanced to a printer, which labels the envelope with data concerning the medicine to be placed therein. The envelope is then dropped into a pivoting chamber and fed by a conveyor-belt into a sleeve. The sleeve is lowered into a loading position, and the envelope is opened by vacuum operated suction devices.

While the envelope is being placed in the loading position, a universal vacuum probe engages a container probe held in a storage container that holds the desired medicine. A vacuum source then creates suction through the container probe, and the container probe is used to individually extract one or more articles comprising the current dose from the storage container and individually deposit the extracted articles into the open envelope. If different types of medicine are also needed to complete the prescription, the universal vacuum probe replaces the container probe, sequentially engages the container probes corresponding to the different types of medicine, removes the required articles of medicine from the corresponding containers, and places them in the same or different envelopes.

More particularly, the dispensing equipment of the envelope-dispensing embodiment of the invention includes a pair of rectilinear arrays accessible through, for example, drawers to facilitate re-stocking or servicing of the arrays. Each rectilinear array carries a plurality of storage containers, wherein each storage container may store a different type of pharmaceutical article, or a different composition, age, lot number, or dosage of medicine. In addition, each storage container is provided with a container probe that is to be uniquely associated with that storage container after the storage container is first filled with medicine. A positioning mechanism is used to align the universal vacuum probe with an individual container probe. Each container probe includes a cap to create a seal between the container probe and the storage container when the container probe is dormant.

In either the "cup-dispensing" or "envelope-dispensing" embodiments of the invention, each storage container is preferably removable from the carousel or rectilinear array. Each storage container is provided with a fitting to accept a refill cartridge which, at selected times, will empty a fresh supply of oral solids into a location of the storage container that is accessible to the container probe. After a refill cartridge is emptied into its storage container, the refill cartridge may be replaced when convenient. Thus, each medication may be conveniently stored and used without mixing medication lots, while assuring that the supply of a specific medication will not be exhausted.

In either the cup-dispensing or the envelope-dispensing embodiments, each storage container receives initial and refill articles from identically sized removable refill cartridges that may be coupled to the storage containers. The lower side of each refill cartridge has a partition that may be selectively opened to permit articles of oral solid medicine to spill from the refill cartridge into the storage container. In the cup-dispensing embodiment, the partition is operated by a cam mounted in the lower drawer. In the envelope-dispensing embodiment, the partition is operated by applying pressure to an actuation tab provided on the cartridge. In either case, when all articles have been removed from the refill cartridge, the empty refill cartridge may be removed and a new refill cartridge inserted with its partition closed.

In an exemplary implementation of the invention, the user of the invention operates a computer to select the type and number of articles to be dispensed. The computer then instructs the dispensing equipment to respond to the user's selection. Electronics internal to the dispenser may be provided to operate sensors and mechanisms in the dispensing equipment. The computer performs inventory functions such as checking expiration dates and monitoring the number of articles remaining in the storage containers.

DESCRIPTION OF DRAWINGS

The nature, objects, and advantages of the invention will become more apparent to those skilled in the art after considering the following detailed description in connection with the accompanying drawings, in which like reference numerals designate like parts throughout, wherein:

FIG. 18 is a rear elevational view of the rack and pinion assembly 1100 of the invention;

FIG. 19 is a side elevational view of the rack and pinion assembly 1100 of the invention;

FIG. 29 is a front elevational view of a sleeve 2514, a carriage 2520, and a rail 2518 of the invention;

FIG. 30 is a side elevational view of the sleeve 2514, the carriage 2520, and the rail 2518 of the invention;

FIG. 31 is an isometric view of an exemplary portable envelope-organizing tote 3100 of the invention, in a fully closed position;

FIG. 32 is a cross-sectional side view of the tote 3100 of the invention;

FIG. 33 is an exploded cross-sectional side view of a container 2528, a refill cartridge 3302, and a container probe 3326 of the present invention;

FIG. 34 is a top plan view of the container 2528, the refill cartridge 3302, and the container probe 3326 of the present invention;

FIG. 35 is a front elevational view of the container 2528, the refill cartridge 3302, and the container probe 3326 of the present invention;

DESCRIPTION OF A PREFERRED EMBODIMENT

1. Hardware Components and Interconnections of Cup-Dispensing Embodiment

Figure 1:
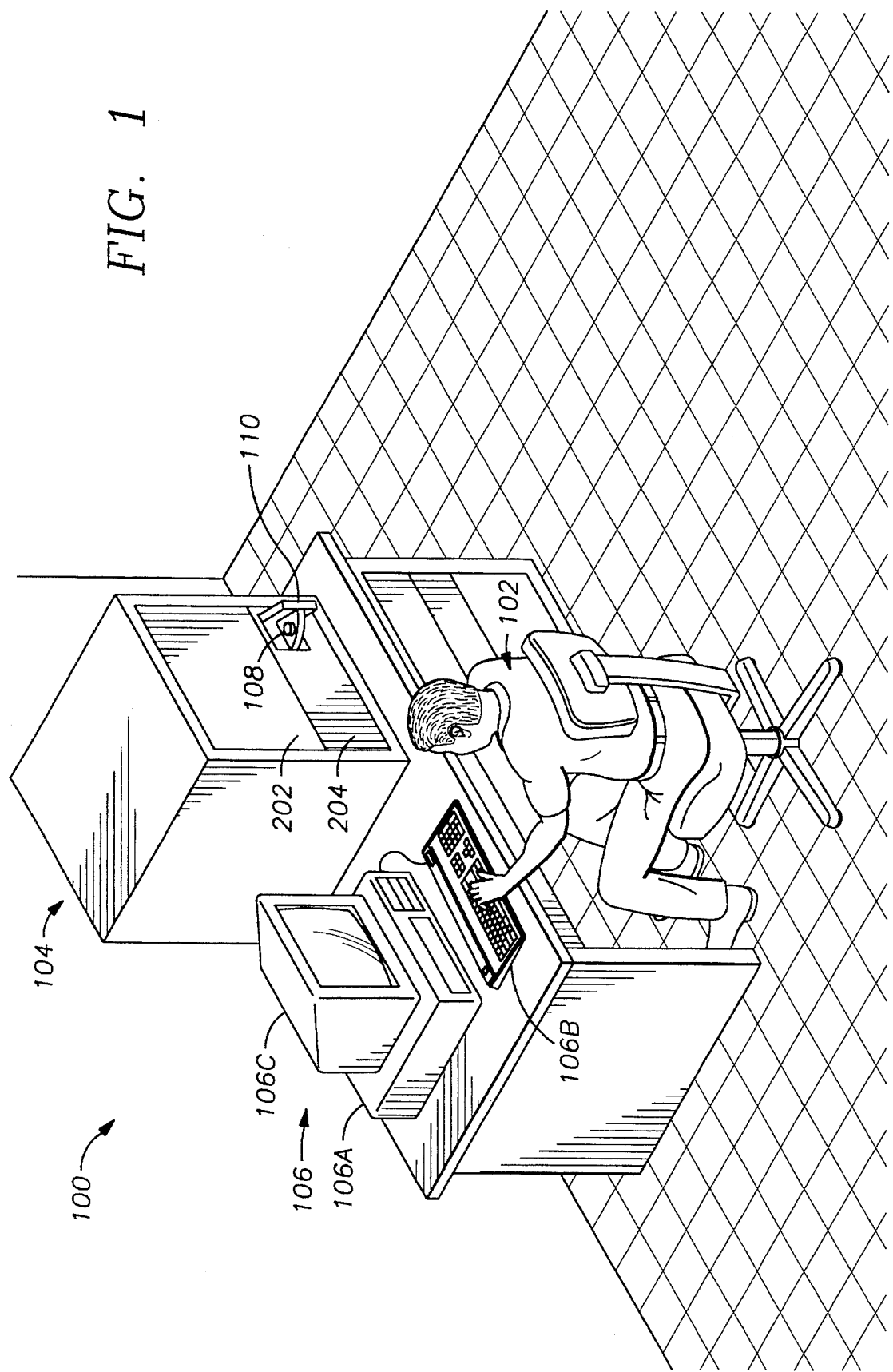
FIG. 1 is a perspective view of a station 100 for dispensing medicine in accordance with the present invention.

The present invention generally involves a station 100 (FIG. 1) for dispensing medicine to a user 102, at a location such as a nursing station of a hospital. The invention generally includes a dispenser 104 and a computer 106. The computer 106 provides an interface to the user 102, and stores various statistics concerning the operation of the dispenser 104. The computer 106 may comprise a personal computer, and preferably includes a central processing unit 106a, a user input device 106b such as a keyboard, and a display 106c such as a video monitor. In accordance with the invention, the user 102 inserts a paper cup 108 or like receptacle into a door 110 in the dispenser 104, and then instructs the dispenser 104 to select one or more types of medicine and quantities thereof by entering the selections in the computer 106. After the dispenser 104 places the requested medicine in a cup 108, the user 102 may remove the cup 108 through a door 110. In an exemplary embodiment of the invention, the invention may dispense medicine in the form of oral solid medicine. Although the invention is not limited to dispensing such medicine, for ease of understanding, the description herein will describe the invention in the context of dispensing oral solid medicine, such as medicine in "pill" form.

Figure 2:
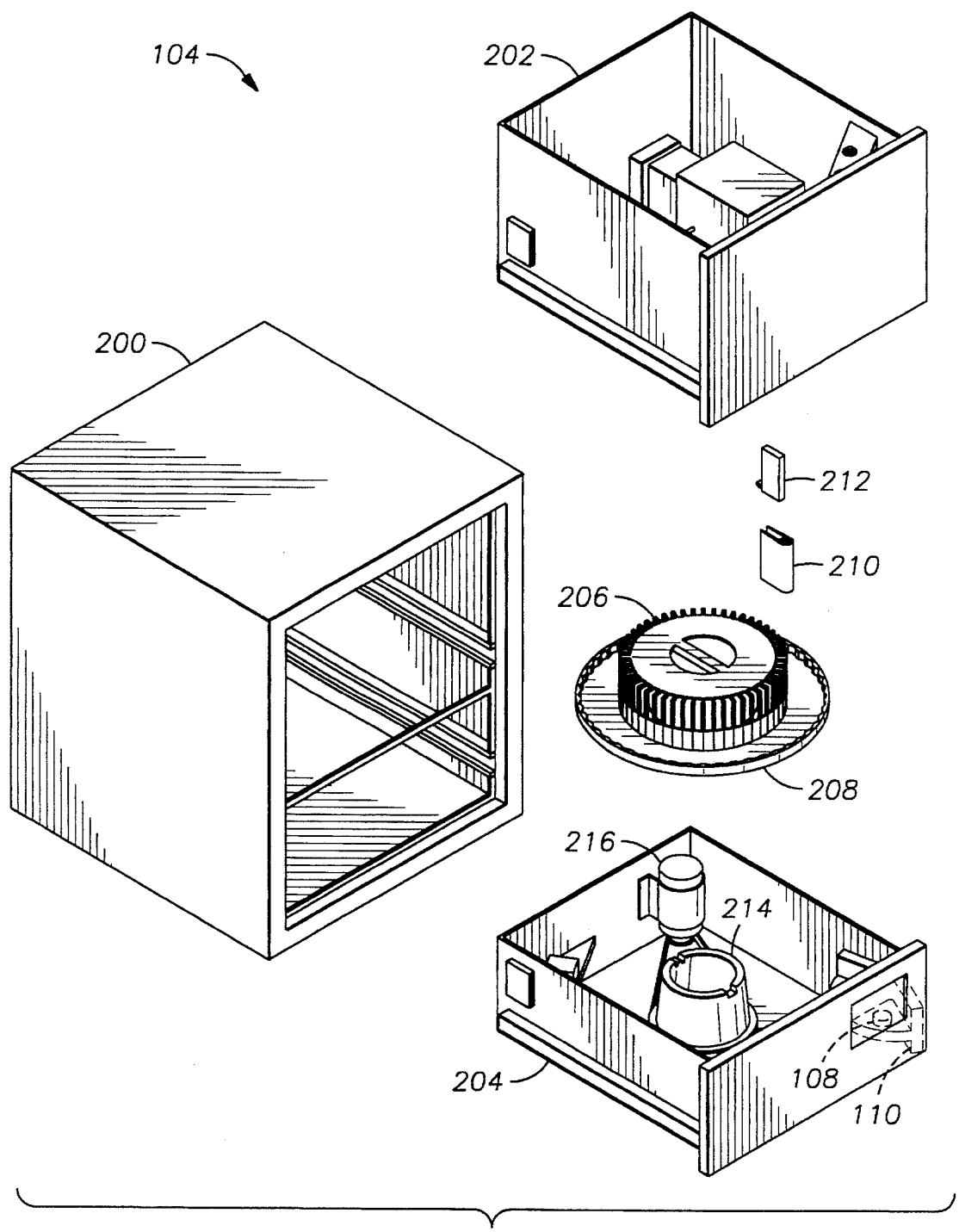
FIG. 2 is a exploded perspective view of a dispenser 104 in accordance with the invention.

As shown in FIG. 2, the dispenser 104 generally includes a housing 200 that accommodates an upper drawer 202 and a lower drawer 204. In a general sense, the lower drawer 204 contains various equipment for storing oral solid medicine pursuant to the present invention, and the upper drawer 202 contains various equipment for extracting the medicine from storage and placing the medicine into the cup 108. More specifically, the lower drawer 204 contains a carousel 206 having a circular tray 208 to receive a plurality of identical containers 210 and container probes 614 (shown in FIG. 6). Alternatively, a movable oval track or even a linear track of containers could be used with the same effect. The containers 210 may be manufactured from a plastic such as polyethylene. In an illustrative embodiment, the carousel 206 and the containers 210 are designed so the carousel 206 holds fifty containers 210, which are placed side-by-side in the tray 208.

In accordance with the invention, each storage container 210 is intended to hold a plurality of items of oral solid medicine, possibly of a different type than the other containers 210. During operation of the dispenser 104, the carousel 206 is seated upon a hub 214. The hub 214 may be rotated by a motor 216 to make a specific storage container 210 accessible for removal of oral solid medicine stored therein.

Each storage container 210 is sized to receive a refill cartridge 212, which provides "backup" oral solid medicine for use when the storage container 210 becomes empty. Like the containers 210, the refill cartridges 212 may be made of a plastic such as polyethylene. In addition, the refill cartridges 212 may include a titanium oxide additive to block radiation that might degrade light sensitive medicine.

Figure 3:
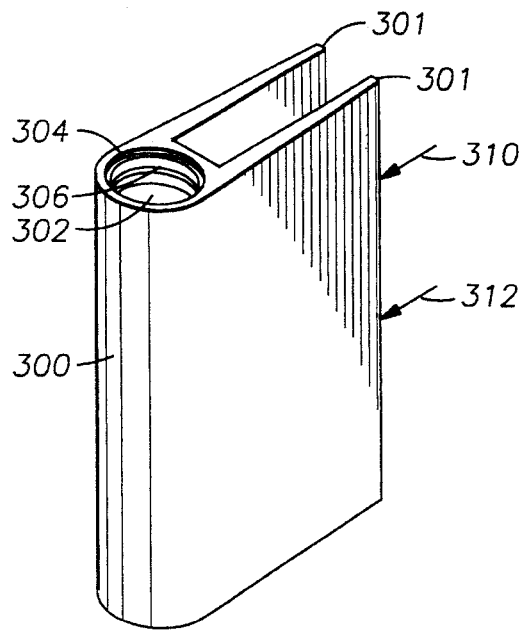
FIG. 3 is a front perspective view of a typical storage container 210 of the invention.

As shown in FIG. 3, a typical storage container 210 includes a curved outer shell 300 and a pair of flanges 301 that are spaced to snugly receive any one of the refill cartridges 212. The storage container 210 has defined therein an aperture 302, which supports an o-ring 304 and a retaining ring 306. The aperture 302 is preferably oval, but may comprise another convenient geometry (such as a rectangular shape) to position a container probe 614 (shown in FIG. 6). The o-ring 304 may comprise buna-n material, nylon, or another suitable material to facilitate the upward and downward sliding of the container probe 614. The retaining ring 306 may comprise a soft skirt made of urethane, or another suitable material to effectively seal the storage container 210 from materials such as dust.

Figure 4:
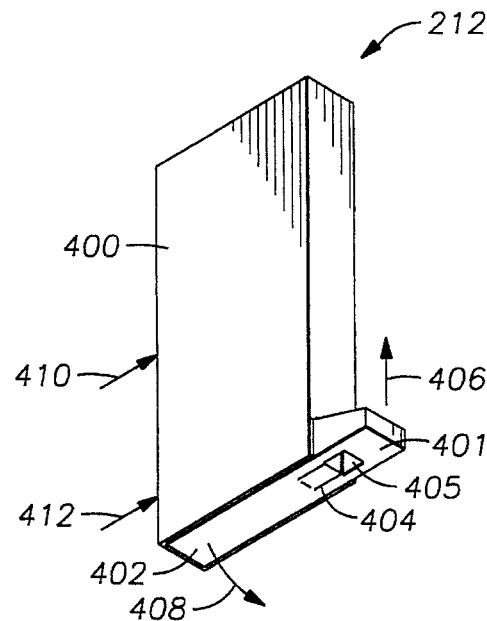
FIG. 4 is a bottom, rear perspective view of a typical refill cartridge 212 of the invention.
Figure 9:
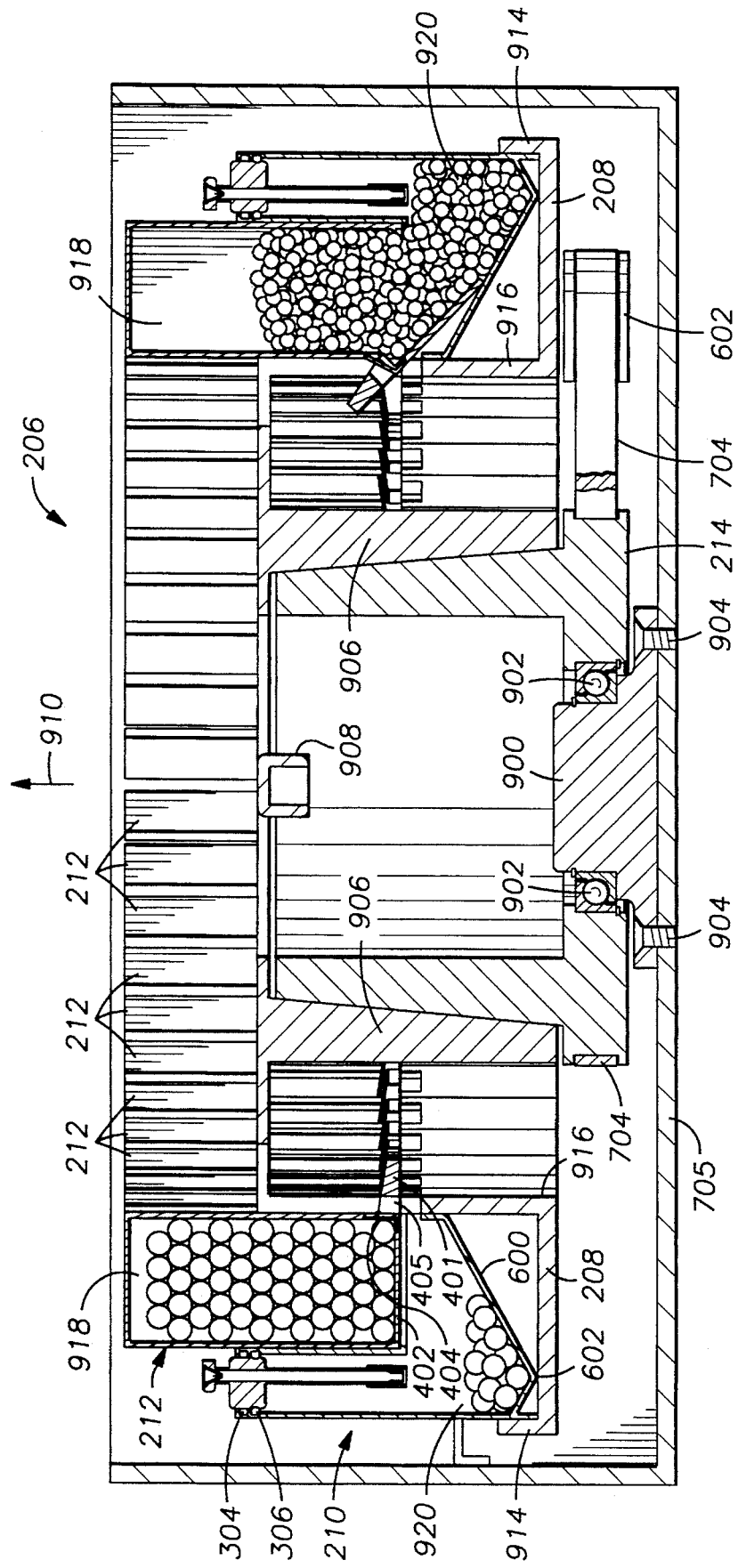
FIG. 9 is a cut-away side view of the contents of lower drawer 204, in accordance with the invention.

Referring to FIGS. 3, 4, and 9, a typical refill cartridge 212 includes a box-shaped body 400 and a hinged partition 402. The refill cartridge 212 of FIG. 4 is inserted into the storage container 210 of FIG. 3 such that points of the refill cartridge 212 denoted by arrows 410, 412 are inserted at about the same locations as the arrows 310, 312 (respectively) of the storage container 210. The storage container 210 coupled to the refill cartridge 212 is illustrated in FIGS. 6 and 9.

The partition 402 of the refill cartridge 212 includes a protruding flange 401, and is flexibly connected to the body 400 by an over-center hinge 404 that extends through an aperture 405 defined in the partition 402. Alternatively, the partition 402 may be connected to the body 400 by another means, such as a single hinge (not shown), where the partition 402 is urged shut by an appropriately mounted coil spring (not shown). When items of medicine are remaining in an current storage location 920 of a storage container 210 (FIG. 9, left), the partition 402 is kept shut to prevent mixing items of medicine that may be from different lot numbers. However, when the current storage location 920 is empty, pressure is applied to the flange 401 in a direction 406, causing the partition 402 to open in a direction 408 (FIG. 4) and permit items of medicine to spill from a backup storage location 918 in the refill cartridge 212 to the current storage location 920 of the storage container 210 (FIG. 9, right).

Figure 6:
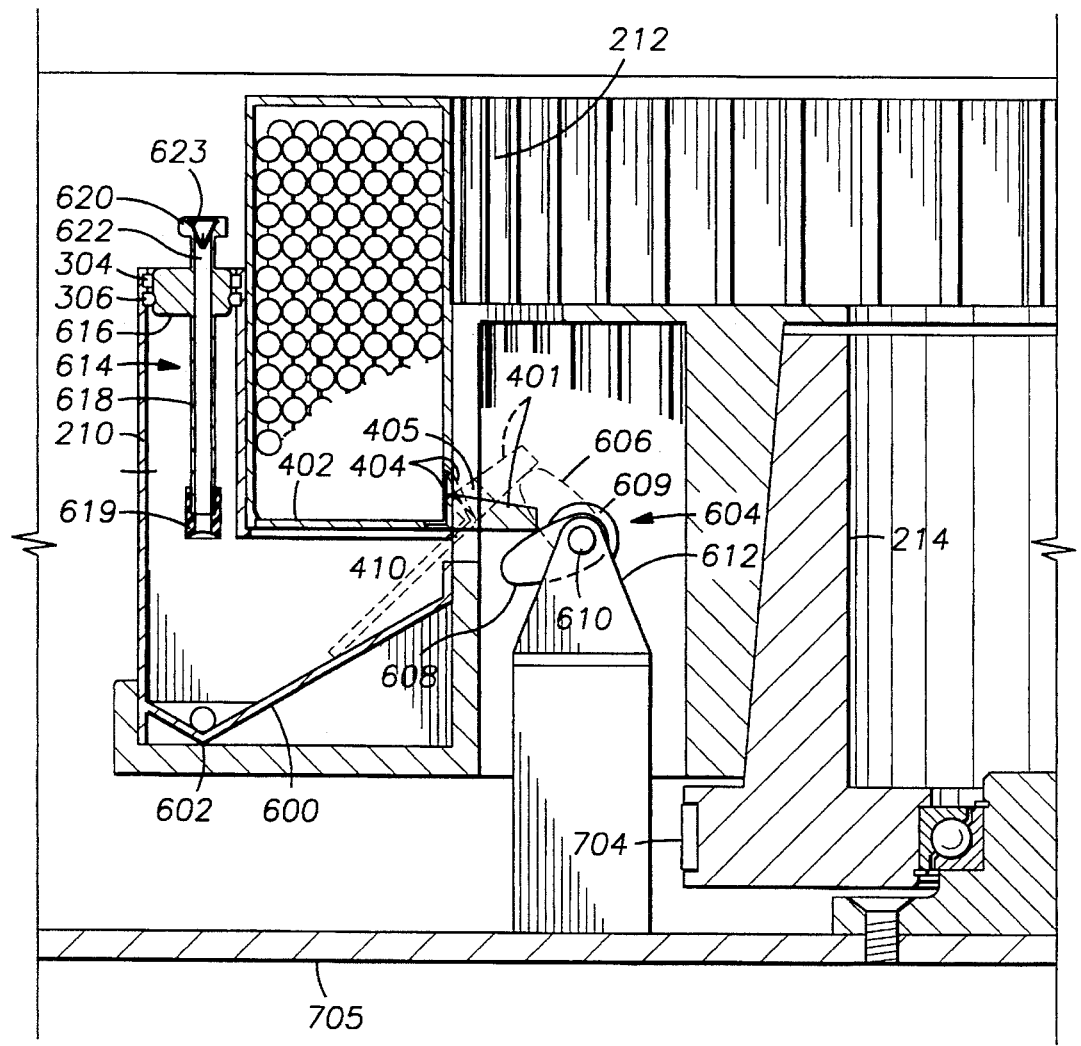
FIG. 6 is a cut-away side view of a lower drawer 204 of the invention, also illustrating the storage container 210 and refill cartridge 212 of the invention.

As shown in FIGS. 6 and 9, the storage container 210 includes an inclined floor 600, which has a pickup area 602 at its lowest point. FIG. 6 also shows a cam 604, which has an engaged position 606 and a disengaged position 608. When the cam 604 is moved into the engaged position 606 by a cam motor 609, the flange 401 is moved upward, thereby opening the partition 402. The cam 604 pivots about an axis 610 that is mounted upon a support member 612, which in turn is mounted on a shelf 705 of the lower drawer 204.

Each storage container 210 also includes a container probe 614 that comprises a probe tip 617, a shaft 618, a plug 616, a neck 622, a hollow head 620, and a funneled inner seat 623. The plug 616 is removably held in place by the retaining ring 306, with which the plug 616 sealingly engages. Each probe tip 617 is made from silicone, low density urethane, or another suitably pliant material. Each probe tip 617 may include a blocking means, such as a wire or screen placed across the diameter of the probe tip 617, or another means to prevent the container probe 614 from completely sucking up any items of oral solid medicine. Preferably, the shaft 618 has a constricted opening and is surrounded by a probe tip 617 of a larger diameter; with this arrangement, an item of oral solid medication is held against the larger probe tip 617 by suction created in the shaft 618, but the constricted opening of the shaft 618 prevents the medicine from being sucked up and through the shaft 618. Although each probe tip 617 is of the same diameter, the probe tips 617 provide a "one size fits all" solution due to their pliant nature, and due to the blocking means that retain medicine on the probe tips.

Figure 7:
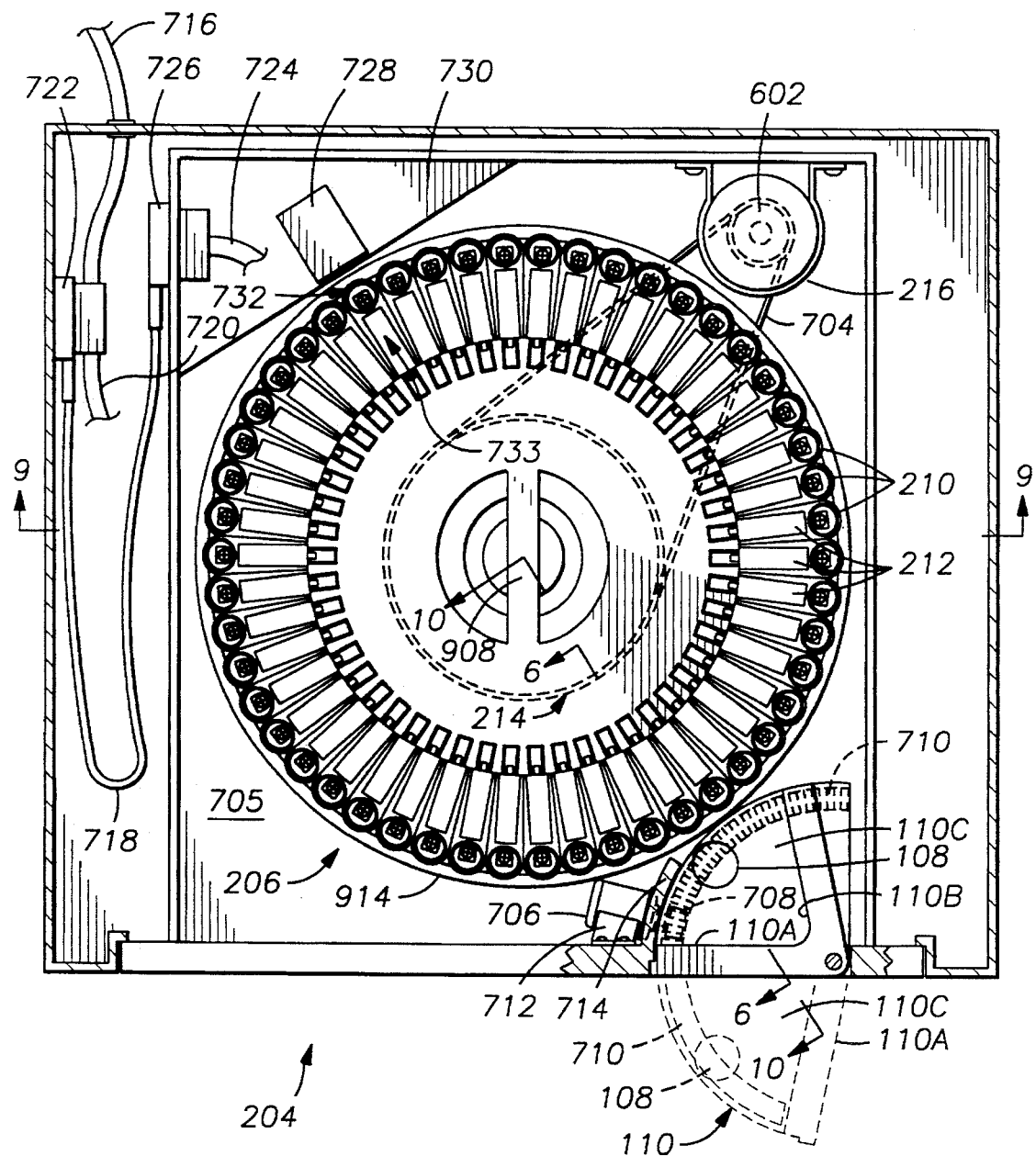
FIG. 7 is a cut-away top plan view of the lower drawer 204 and its contents, in accordance with the invention.

Referring to FIG. 7, the lower drawer 204 of the invention can be seen to house the carousel 206 and its fifty containers 210. The carousel 206 surrounds and frictionally engages the hub 214. The hub 214 is rotated by a pulley 602 of the motor 216, via a belt 704. The components of the lower drawer 204 rest upon a shelf 705.

The cup door 110 includes an outside panel 110a, an inside panel 110b, and a shelf 110c for supporting the cup 108. A motor 706 opens and closes the door 110 by rotating a gear 708 against a rounded track 710 mounted on a lower surface (not shown) of the shelf 110c. The motor 706 is affixed to the lower drawer 204 by a mounting bracket 712. A ridge 714 blocks access to the inside of the lower drawer 204 when the door 110 is partially open. In an alternative embodiment, a spring loaded solenoid (not shown) may be provided to open the door 110, instead of the motor 706. In this case, the cup door 110 is opened by energizing the solenoid.

The dispenser 104 receives electrical power from a power cord 716, which is electrically attached to a lower ribbon cable 718 and a cord 720 via a jack 722. As described more completely below, the cord 720 runs upward to provide electrical power to components of the upper drawer 202. The lower ribbon cable 718 (shown on its side) provides electrical power to various components of the lower drawer 204 via a cord 724, which is partially shown for ease and clarity of illustration. The cord 724 is electrically attached to the lower ribbon cable 718 via a jack 726.

Also provided is a lower code reader 728, which is affixed to a shelf 730. The lower code reader 728 comprises a bar code reader, an electrical memory reader, or another device for reading an optical or electrical code furnished by the storage container 210 in a position 732. The code provided by the storage container 210 may comprise a bar code, another type of optical symbol, or an electrical signal stored in a memory device, or a similar identifying code. One exemplary memory device is the 1 K-Bit, 4 K-Bit, or 4 K-Bit Plus Touch Memory manufactured by Dallas Semiconductor under model Nos. DS1992, DS1993, or DS1994, respectively. The storage container 210 in the position 732 houses a refill cartridge 212 in a position 733, which also furnishes an optical or electrical code.

Figure 8:
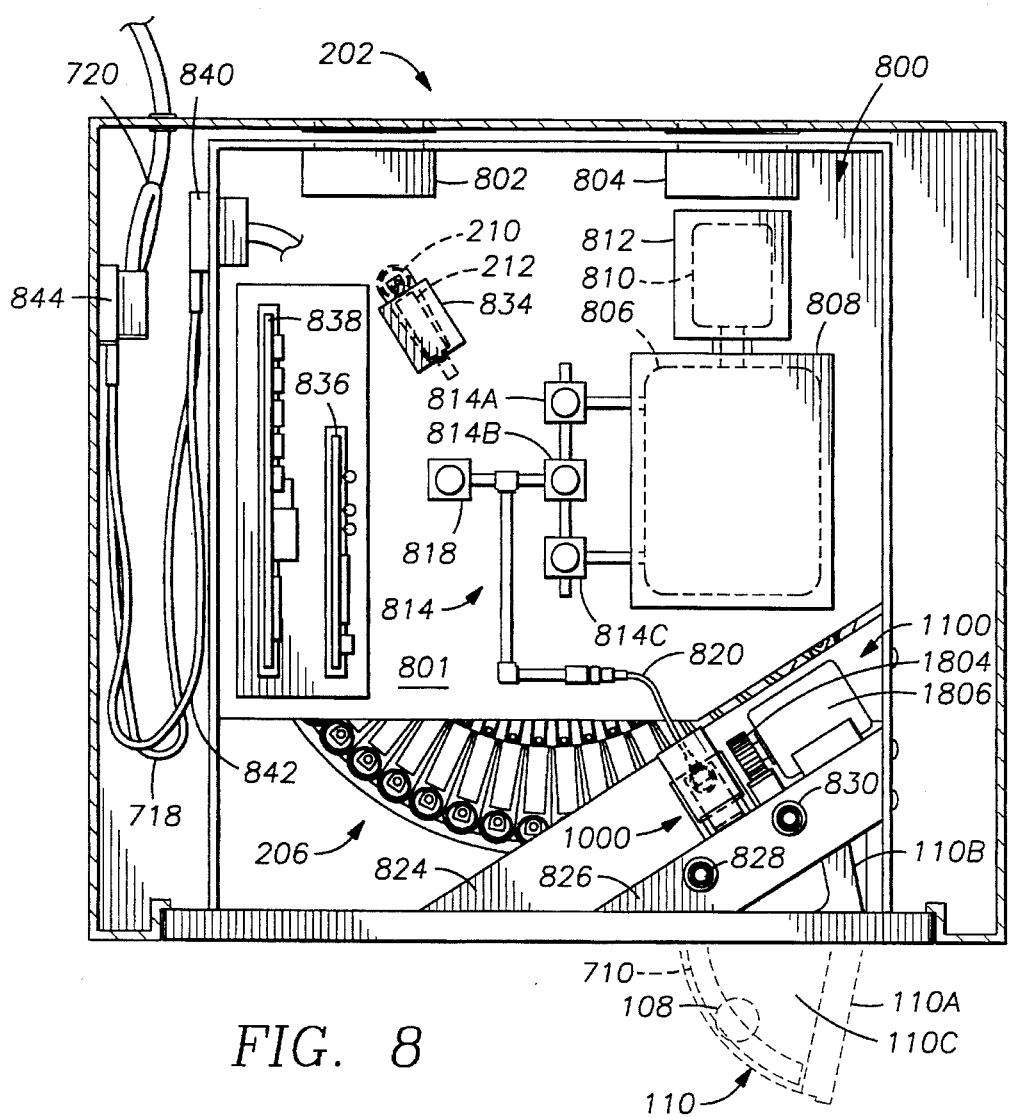
FIG. 8 is a cut-away top plan view of an upper drawer 202 and its contents, in accordance with the invention.

Referring to FIG. 8, the upper drawer 202 of the invention can be seen to house a number of components, including various items of vacuum equipment 800. As described in greater detail below, the vacuum equipment 800 provides suction used in removing oral solid medicine from the containers 210. The vacuum equipment 800, which rests upon a shelf 801, includes a pair of exhaust fans 802, 804. A vacuum pump 806 is contained within a sound isolation chamber 808. The vacuum pump 806 is driven by a pump motor 810, which is connected to a heat sink 812.

Figure 8A:
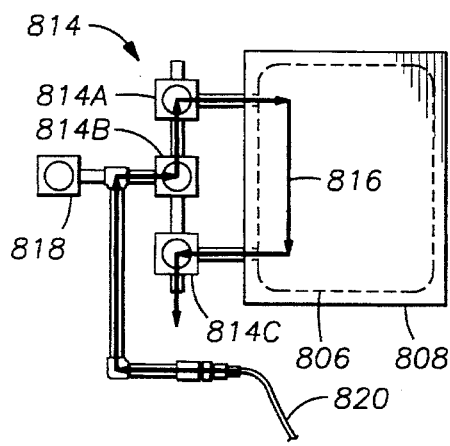
FIG. 8A is close-up top plan view of the vacuum equipment 800 of the invention, illustrating airflow in a path 816.
Figure 8B:
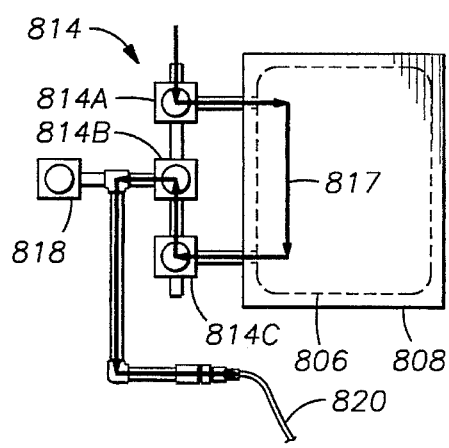
FIG. 8B is a close-up top plan view of the vacuum equipment 800 of the invention, illustrating airflow in a path 817.

In an illustrative embodiment, the vacuum pump 806 may comprise a GAST brand centrifugal vane pump, or another pump capable of sustaining about 4 cubic feet per minute of free airflow, and a pressure of at least 26 to 27 inches of mercury. The vacuum pump 806 is operatively connected to a 3-way solenoid valve 814, having valve elements 814a, 814b, and 814c. Referring additionally to FIGS. 8A and 8B, the valve elements 814a, 814b, and 814c operate to selectively move air in a path 816 to create suction in a line 820, or to move air in a path 817 to blow air through the line 820. The element 814b comprises a pressure regulator, which functions to regulate pressure in the vacuum system to about 20 inches of mercury. A detector 818 may comprise a pressure transducer to measure the absolute pressure or a change in pressure of the air downstream from the probe tip 617, i.e. between the probe tip 617 and the vacuum pump 806. The detector 818 also provides an electrical signal representative of such measurement. Alternatively, the detector 818 may comprise an airflow meter to measure the absolute airflow or a change in airflow downstream of the probe tip 617, and provide a representative electrical signal. The line 820 connects the detector 818 and the valve 814 to a probe assembly 1000 (FIG. 8).

As shown in FIG. 8, the upper drawer 202 includes a lower shelf 824 and an upper shelf 826 to support the probe assembly 1000 and a rack and pinion assembly 1100. Spanning the lower shelf 824 and the upper shelf 826 are first and second rods 828, 830. As described in greater detail below, the rack and pinion assembly 1100 is provided to move the probe assembly 1000 in various directions.

An upper code reader 834 is positioned to read a code from the refill cartridge 212 in the position 733 (FIG. 7), through an aperture (not shown) in the shelf 801. A control board 836 is provided to manage the code readers 834, 728. Moreover, a controller 838 is provided to operate the components of the dispenser 104. For example, the controller 838 may include electronics for controlling or receiving signals from the motor 216, the door motor 706, the vacuum pump 806, the detector 818, the 3-way solenoid valve 814, the pressure regulator 816, the probe assembly 1000, the rack and pinion assembly 1100, the cam motor 609, and the control board 836. Moreover, the main controller 838 may house additional or expansion random access memory (not shown). The controller 838 may include a microcomputer such as a Motorola 68000 family microprocessor, in addition to random access memory, buffers, permanent memory, and other suitable components.

The control board 836 and the controller 838 receive electrical power from a jack 840, which is electrically attached to an upper ribbon cable 842. The ribbon cable 842 is electrically attached to a jack 844, which receives electrical power from the cord 720.

Referring to FIG. 9, the lower drawer 204 contains the hub 214, which is supported by a base 900, about which the hub 214 rotates, as guided by ball bearings 902. The hub 214 may be mounted to the shelf 705 by fastening members 904, which may comprise bolts, screws, or other suitable connecting devices. The carousel 206 includes a rim 906 that seats upon and frictionally engages the hub 214. By means of a handle 908 that rests in a pair of channels (not shown) in the carousel 206, the carousel 206 may lifted in an upward direction 910 for removal from the hub 214. The handle 908 and the carousel 206 may be "keyed," so that they only fit together in one orientation.

Figure 9A:
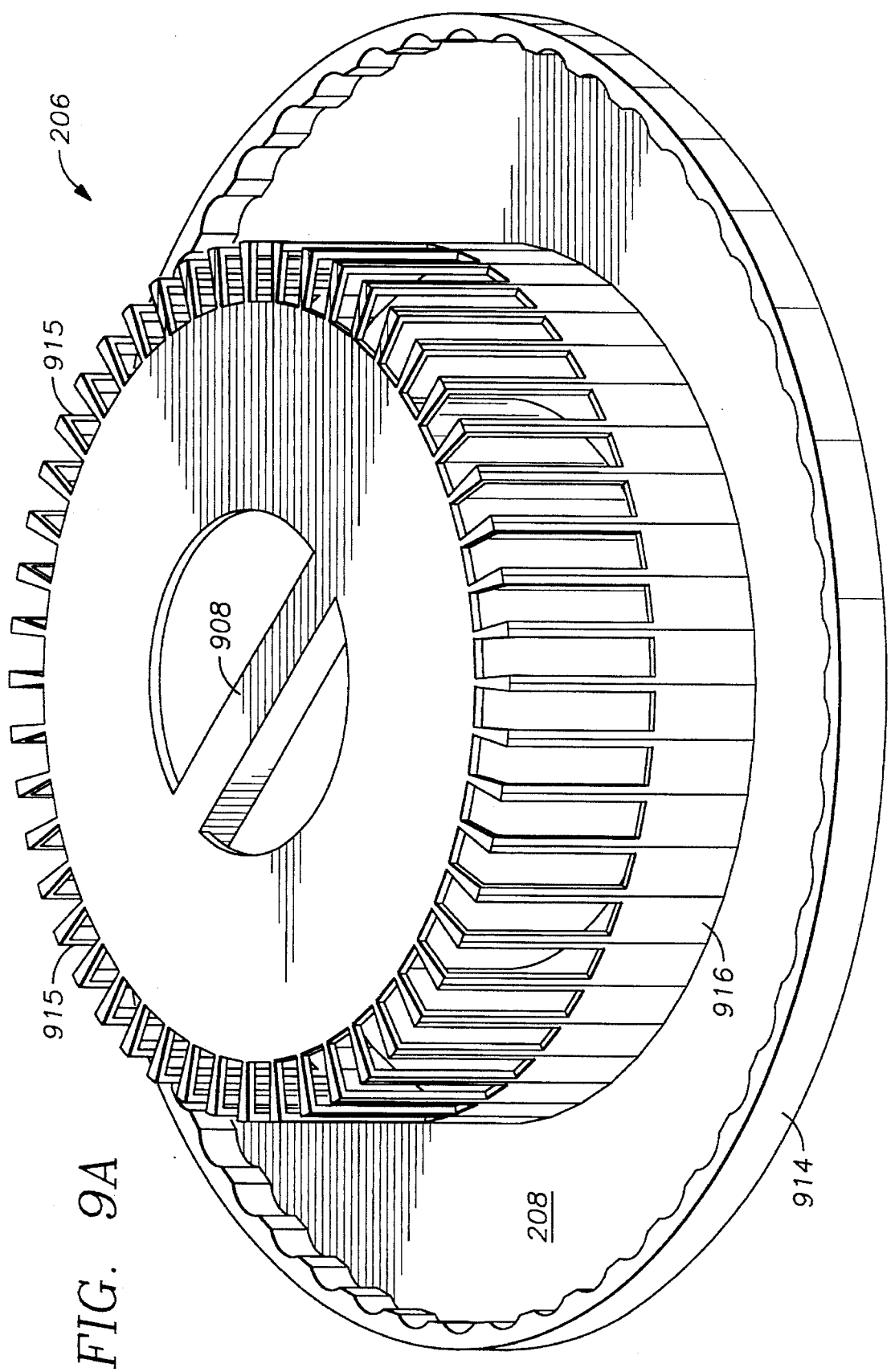
FIG. 9A is a perspective view of a carousel 206 of the invention.

The carousel 206 holds the containers 210 and refill cartridges 212 firmly in position about the carousel 206. In particular, as shown in FIGS. 9 and 9A, the carousel 206 includes a flat, ring-shaped support tray 208, upon which the containers 210 rest. In addition, the ring-shaped tray 208 is connected to a scalloped rim 914, shaped to accommodate the curved outer shells 300 of the containers 210. An inner wall 916 abuts against the opposite sides of the containers 210, and cooperates with the scalloped rim 914 to firmly hold the containers 210 therebetween. The wall 916 has defined therein a plurality of channels 915 to accommodate the flanges 401 of the refill cartridges 212 while the refill cartridges 212 are slid downward into their respective containers 210.

A sequence used to retrieve medicine in accordance with the invention will now be described. With reference to FIGS. 10–16, FIG. 10 shows the probe assembly in its dormant position. The probe assembly 1000 includes a universal vacuum probe 1001, which assists in extracting oral solid medicine from the storage container 210. The universal vacuum probe 1001 is shown completely disengaged from the container probe 614. The universal vacuum probe 1001 includes a probe arm 1002 and a probe finger 1004 that slidably reciprocates within the probe arm 1002. The finger 1004 is connected to a base 1006, which is pivotably attached to an arm 1008, which is pivotably attached to a first reciprocating piston 1010 of a first cylinder 1012. The arm 1008 is pivotably attached about its central axis 1014 to an L-shaped member 1016, which also functions to support the probe arm 1002. Accordingly, as the cylinder 1010 extends, the finger 1004 extends through the probe arm 1002.

The L-shaped member 1016 is supported by a joint 1018, which is connected to a central flange 1019 of a bracket 1020 that slides about the rod 828 (shown in FIGS. 8, 18) and the rod 830. The L-shaped member 1016 is fastened between a second cylinder 1024 and a nut 1026. A second reciprocating piston 1028 is pivotably connected to the central flange 1019, so that the probe arm 1002 moves in a direction 1030 as the piston 1028 extends.

Figure 10:
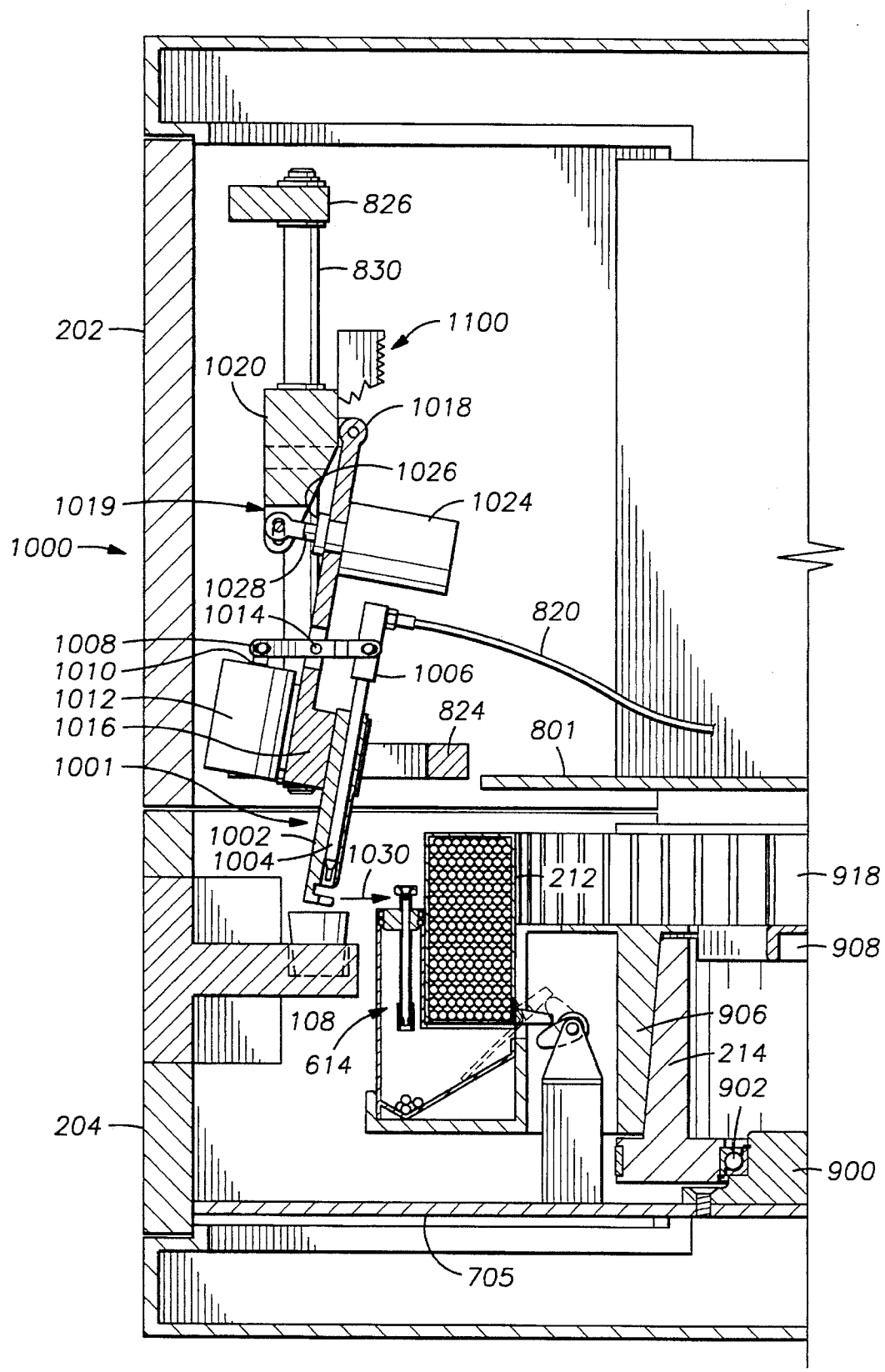
FIG. 10 is a cut-away side view of a probe assembly 1000 of the invention, in a completely disengaged position.
Figure 11:
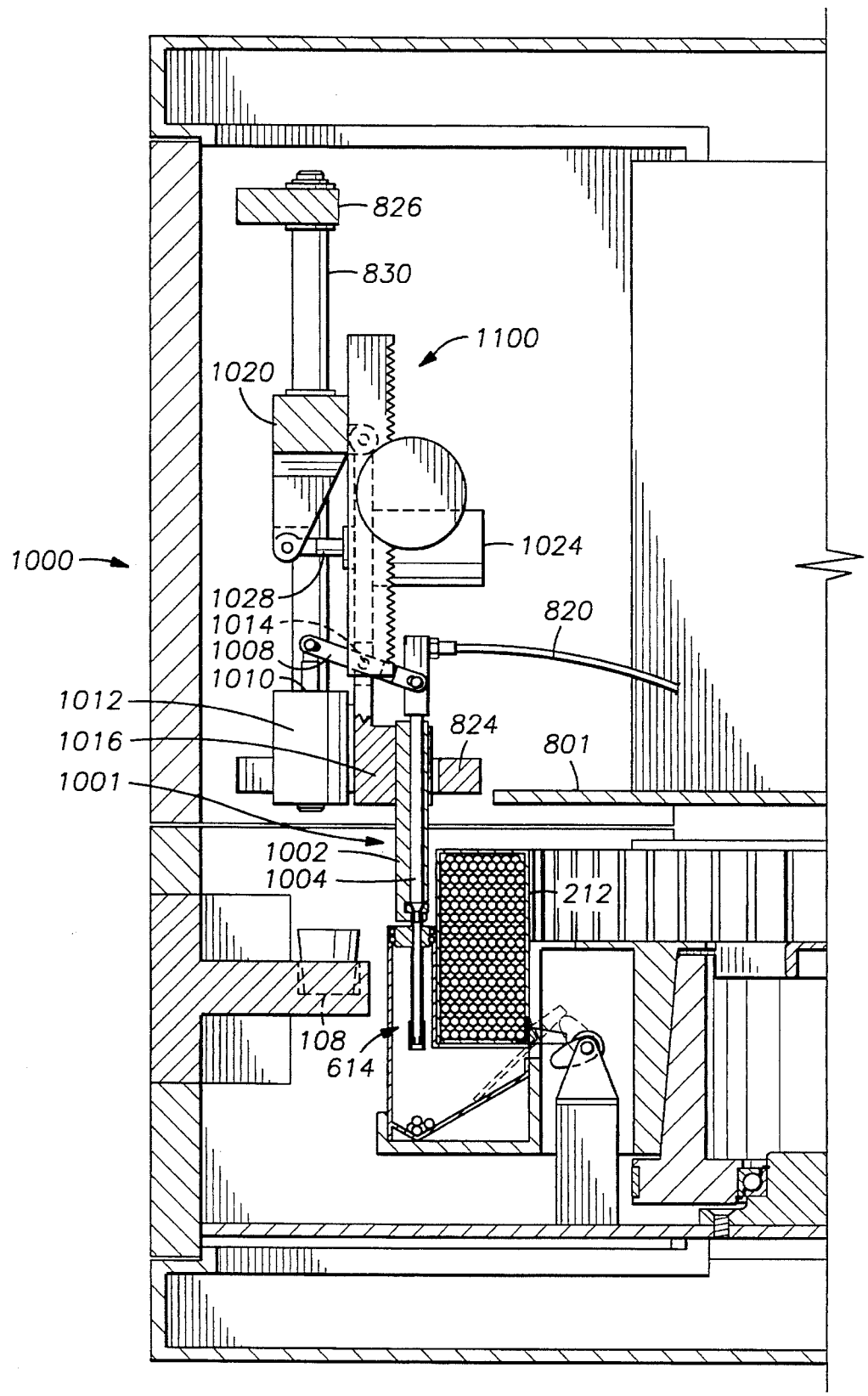
FIG. 11 is a cut-away side view of the probe assembly 1000 of the invention with a universal vacuum probe 1001 shown engaging a container probe 614.

To dispense medicine in accordance with the invention, the probe assembly 1000 is moved from the position of FIG. 10 to that of FIG. 11, wherein the probe arm 1002 is engaged with the container probe 614. To position the probe arm 1002 in this position, the piston 1028 is extended and the bracket 1020 is lowered down the rods 828, 830 using the rack and pinion assembly 1100, the operation of which will be described in greater detail below.

Figure 12:
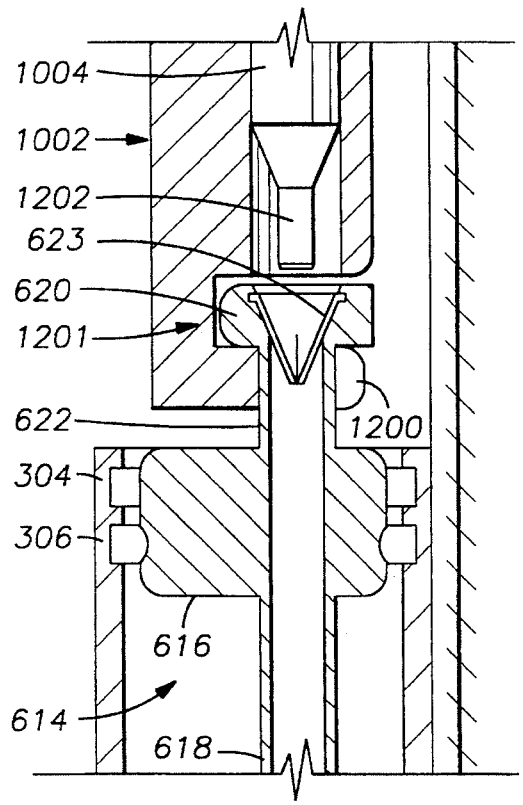
FIG. 12 is a close-up cut-away side view of a probe nozzle 1202 being inserted into the container probe 614, in accordance with the invention.
Figure 13:
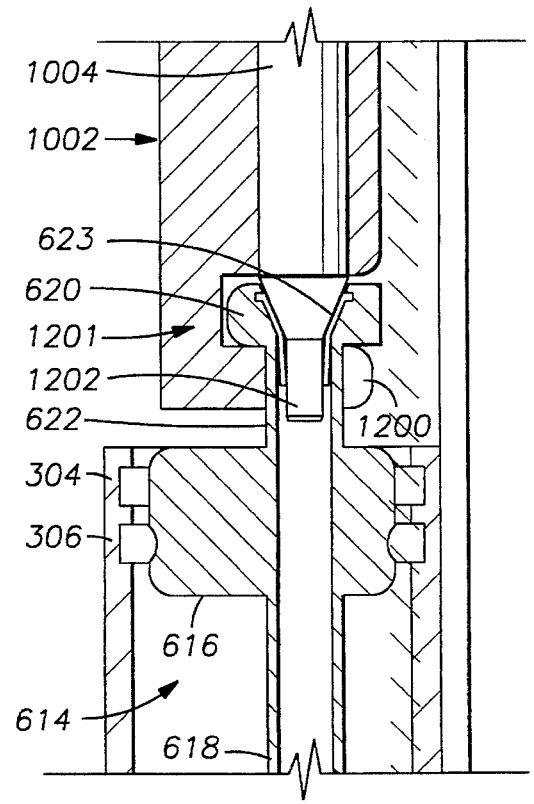
FIG. 13 is a close-up cut-away side view of the probe nozzle 1202 fully inserted into the container probe 614, in accordance with the invention.
Figure 5:
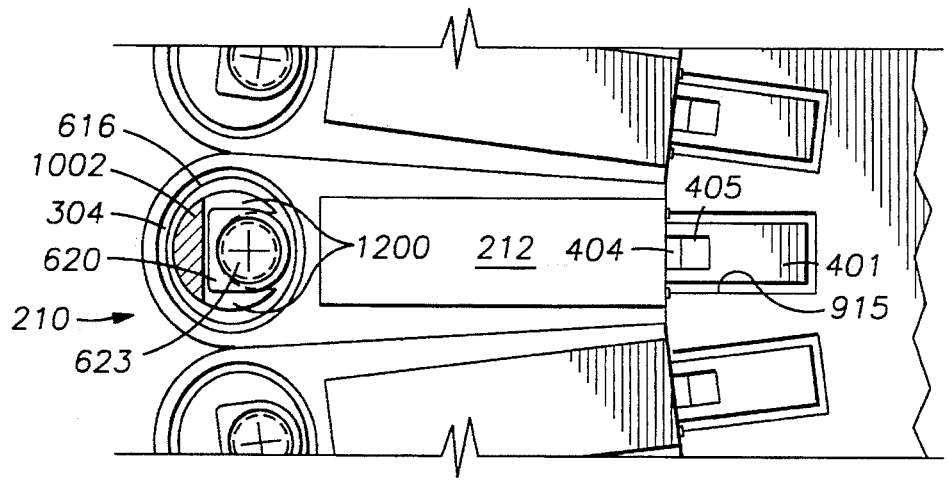
FIG. 5 is a top plan view of the storage container 210 with the refill cartridge 212 coupled thereto, in accordance with the invention.

As shown in greater detail in FIGS. 12–13, the engagement of the probe arm 1002 and the container probe 614 is accomplished by extending the piston 1028, causing a fork 1200 of the probe arm 1002 to enclose the neck 622. The probe head 620 is held firmly in place by the probe arm 1002, by means of a notch 1201 defined in the probe arm 1002. The engagement of the probe finger 1004 and the container probe 614 is accomplished by extending the piston 1010, causing a hollow finger nozzle 1202 to fictionally engage the funneled inner seat 623, as shown in FIG. 13.

Figure 14:
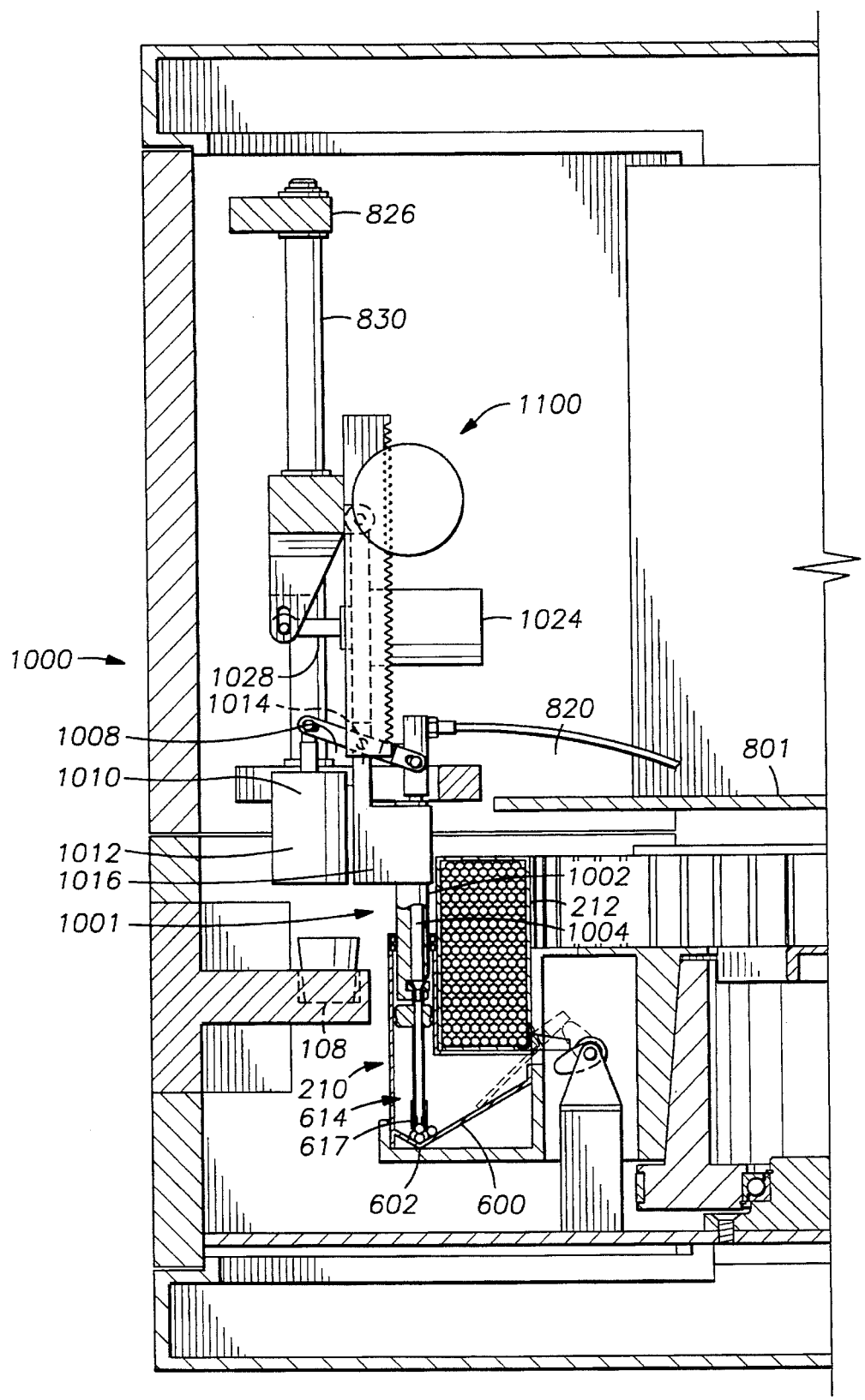
FIG. 14 is a cut-away side view of the probe assembly 1000 of the invention, with the container probe 614 fully lowered.

After the probe arm 1002 engages the container probe 614, the probe arm 1002 and container probe 614 are lowered to the pickup area 602 of the inclined floor 600 (FIG. 14). This is accomplished by the rack and pinion assembly 1100, as described in greater detail below. In this position, the vacuum equipment 800 is utilized to enable the probe tip 617 to extract an item of oral solid medicine from the storage container 210. Even if there is only one item of oral solid medicine remaining in the storage container 210, the inclined floor 600 will direct the last item of oral solid medicine to the pickup area 602 for extraction by the container probe 614.

Figure 15:
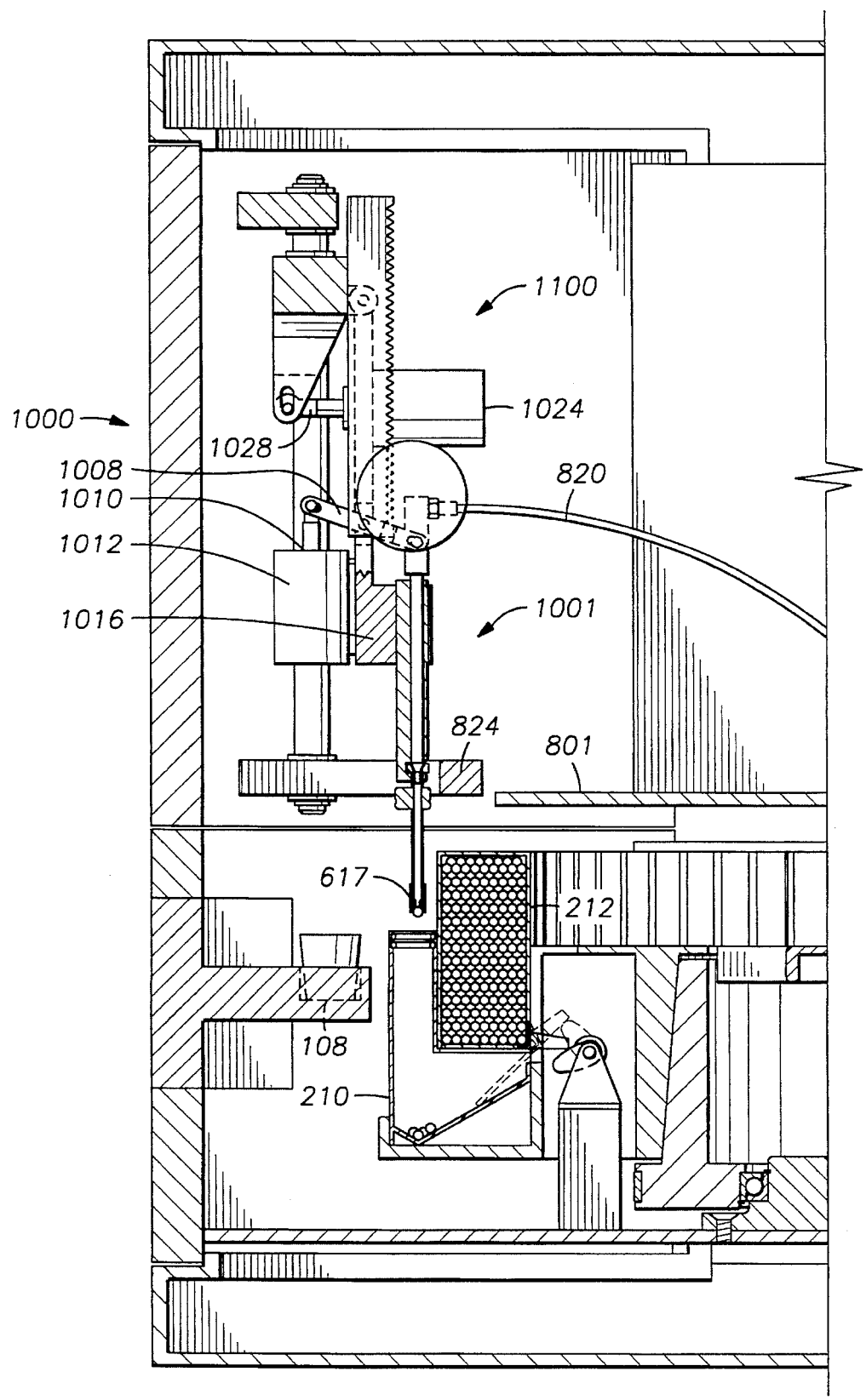
FIG. 15 is a cut-away side view of the probe assembly 1000 of the invention, with the container probe 614 completely removed from the storage container 210.
Figure 16:
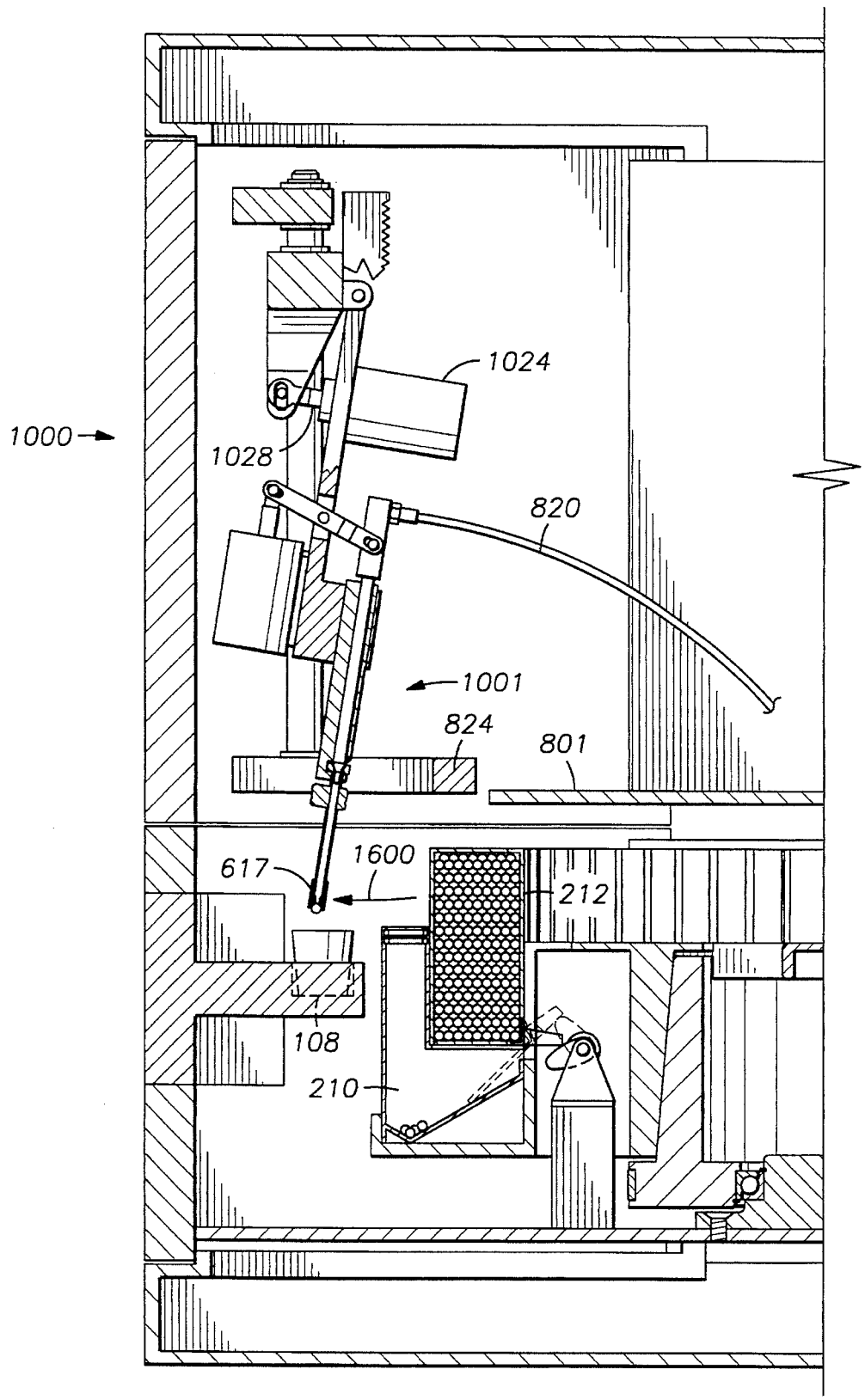
FIG. 16 is a cut-away side view of the probe assembly 1000 of the invention, with the container probe 614 depositing an item of oral solid medicine in the cup 108.
Figure 17:
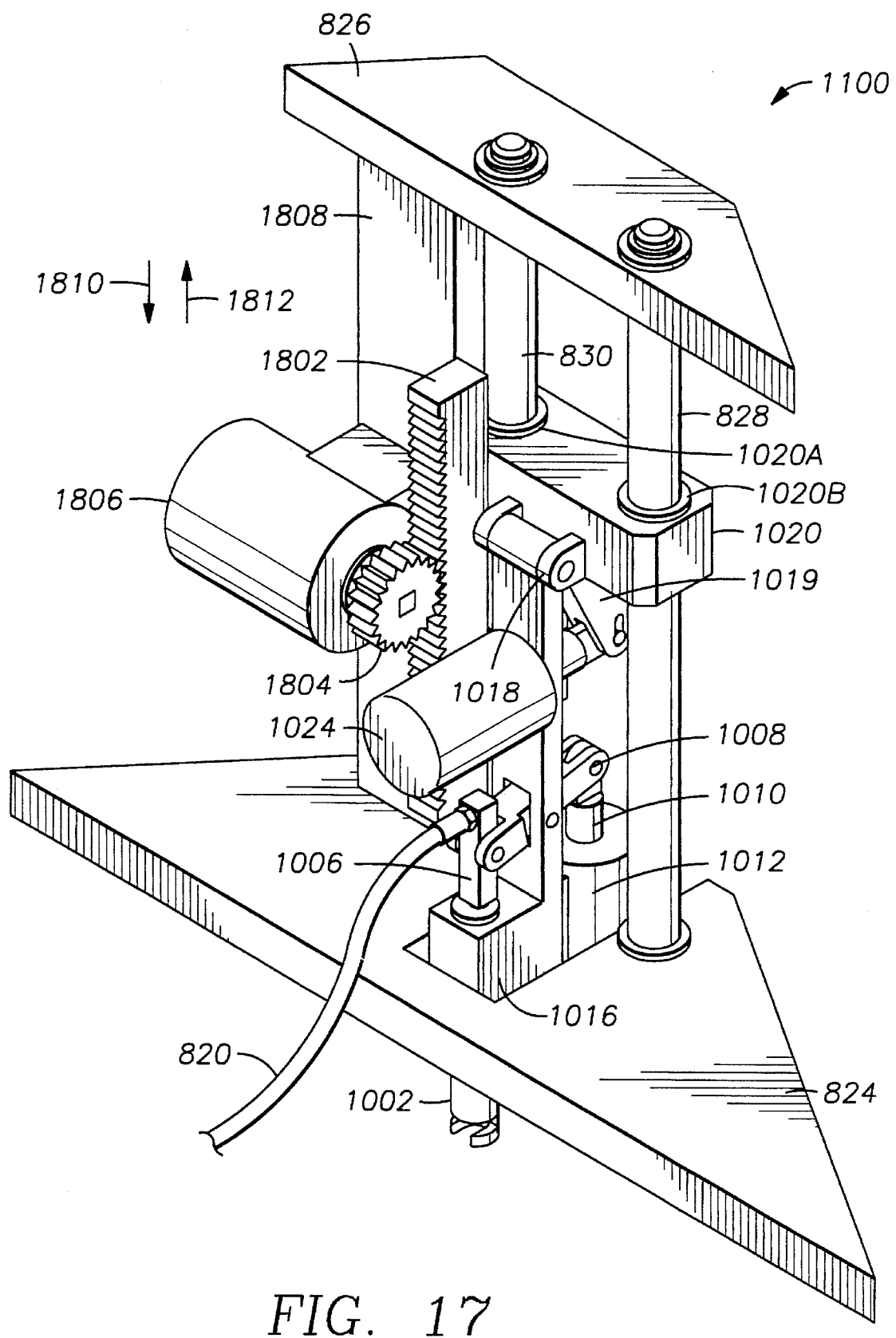
FIG. 17 is a perspective view of the rack and pinion assembly 1100 of the invention.
Figure 20:
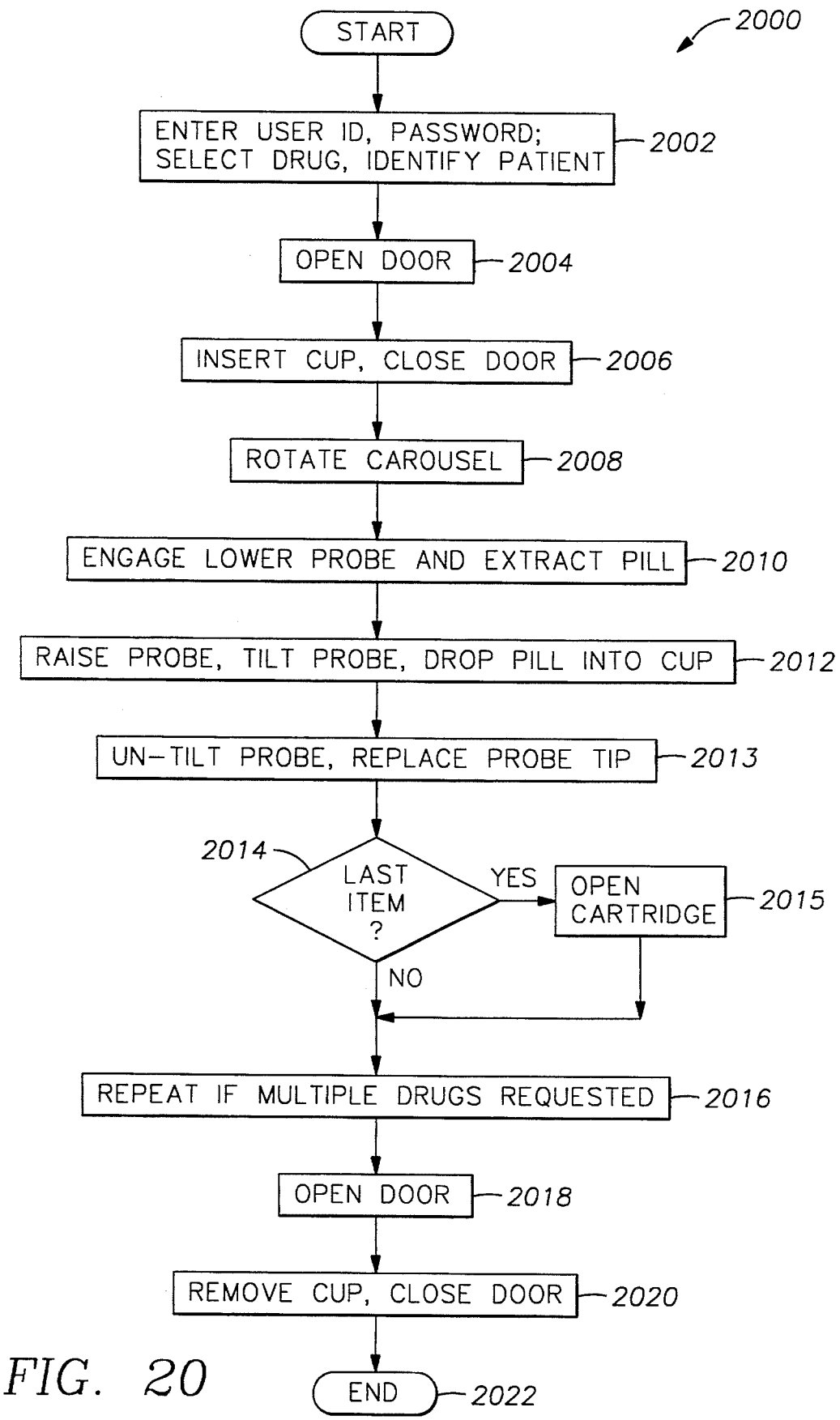
FIG. 20 is a flowchart illustrating the steps for medical personnel, such as nurses, to obtain medicine in accordance with one embodiment of the invention.

When it has been determined that the probe tip 617 contains one item of oral solid medicine, the probe tip 617 is completely removed from the storage container 210, as shown in FIG. 15. This is accomplished by lifting the universal vacuum probe 1001 using the rack and pinion assembly 1100, the construction of which is described below. Then, the universal vacuum probe 1001 is positioned to drop the medicine into the cup 108, as shown in FIG. 16. After removing the probe tip 617 from the storage container 210, the piston 1028 is withdrawn into the cylinder 1024, thereby moving the universal vacuum probe 1001 in the direction 1600. In this position, the vacuum equipment 800 may reduce or discontinue suction to drop the retrieved item of oral solid medicine into the cup 108. In addition, suction may be reversed as shown in FIG. 8B. Then, the universal vacuum probe 1001 is moved into its disengaged position by moving it through the positions of FIGS. 15, 11, 12, and 10.

The rack and pinion assembly 1100 will now be described in greater detail, with reference to FIGS. 17–20. The rack and pinion assembly 1100 includes a bracket 1020, which is slidably attached to the rods 828,830 by dual upper bushings 1020a, 1020b. A lower bushing 1800 is slidably attached to the rod 830. A rack gear 1802, which is longitudinally oriented along the rod 830, rigidly interconnects the lower bushing 1800 and the bracket 1020. The rack gear 1802 is operatively engaged with a pinion gear 1804, which is controlled by a motor 1806. The motor 1806 is held in place by a fixture 1809, which is mounted to a vertical support member 1808 by fastening means 1811, which may comprise screws, bolts, or other suitable connecting devices. Accordingly, when the controller 838 directs the motor 1806 to rotate the pinion gear 1804, the rack gear 1802 is caused to move longitudinally along the rod 830, in either direction 1810 or 1812. Likewise, when the rack gear 1802 moves, so does the probe assembly 1000, which is attached to the bracket 1020.

2. Operation of Cup-Dispensing Embodiment

Having described the hardware components and interconnections of one embodiment of the invention, some illustrative methods of utilizing the invention will be described. One intended user of the invention is a doctor, nurse, medical technician, or other person who uses the invention to obtain medicine from it. Such a user may operate the invention according to a number of tasks 2000, shown in FIG. 20. In task 2002, the user identifies himself/herself to the computer 106 by entering a user ID upon the keyboard 106b, by presenting a magnetic card (not shown) to the computer 106, by furnishing an electronic card (not shown) to the computer 106, or by another suitable method. Additionally, if added security is desired, the computer 106 may require the user to enter a unique password upon the keyboard 106b. Next, the user identifies the desired drug and the patient for whom the drug is intended, again by using the keyboard 106b. By identifying the patient to the computer 106, the user enables the computer 106 to cross-check the desired drug against a stored record of any of the patient's allergies, medical problems, or other concerns. In addition, this permits the computer 106 to maintain a log of the type and quantity of drugs dispensed for each patient.

Next, the computer 106 sends the user's request to the controller 838, and the controller 838 begins in task 2004 by directing the motor 706 to open the door 110. In task 2006, the user inserts the cup 108, and manually closes the door 110. In an alternative embodiment, the controller 838 may close the door 110 automatically after an instruction is received from the user via the keyboard 106b and computer 106. Next, in task 2008 the controller 838 commands the motor 216 to rotate the carousel 206, until the desired cartridge 210 is adjacent to the cam 604, and beneath the probe assembly 1000.

In task 2010, the controller 838 causes the cylinder 1024 to extend the piston 1028, moving the universal vacuum probe 1001 opposite the direction 1600 (FIG. 16), and over the storage container 210. This causes the fork 1200 to engage the neck 622, and the notch 1201 to engage the head 620. The controller 838 then directs the rack and pinion assembly 1100 to lower the universal vacuum probe 1001 into the position of FIG. 14. The plug 616 is forced through the retaining ring 306, and the probe tip 617 is lowered until the detector 818 detects an increase in vacuum pressure from the normal pressure of about 20 inches of mercury. Such an increase indicates blockage of the probe tip 617 due to the presence of one or more items of oral solid medicine.

An increase in pressure to 22 or 23 inches of mercury typically indicates the presence of multiple items of medicine on the probe tip 617. In this case, the vacuum equipment 800 modulates the suction in the probe tip 617 and/or raises and lowers the position of the container probe 614, to dislodge the surplus items of medicine. When the detector 818 determines that the pressure of the vacuum equipment 800 is about 26 or 27 inches of mercury, a single item of oral solid medicine is present at the probe tip 617.

When a single item of oral solid medicine is present at the probe tip 617, the controller 838 in task 2012 instructs the rack and pinion assembly 1100 to raise the container probe 614 into the position of FIG. 15. Then, the controller 838 directs the cylinder 1024 to withdraw the piston 1028, thereby moving the container probe 614 into the position of FIG. 16. At this point, the vacuum equipment 800 terminates, reduces, or reverses vacuum pressure to drop the item of oral solid medicine into the cup 108.

In task 2013, the controller 838 instructs the cylinder 1024 to extend the piston 1028, thereby moving the container probe 614 back into the position of FIG. 15. The controller 838 then directs the rack and pinion assembly 1100 to lower the container probe 614 into the position of FIG. 11, where the container probe 614 engages with the retaining ring 306 of the storage container 210. With the probe arm 1002 and finger 1004 in place, the controller 838 commands the cylinder 1012 to withdraw the piston 1010, thereby removing the finger nozzle 1202 from the funneled inner seat 623, and removing the probe finger 1004 from the container probe 614, as shown in FIG. 12. Then, the controller 838 commands the cylinder 1024 to withdraw the piston 1028, to move the universal vacuum probe 1001 into the position of FIG. 10.

In query 2014, the controller 838 asks whether the probe tip 617 removed the last item of oral solid medicine in task 2012. This information is available since the computer 106 maintains a record of the number of items of oral solid medicine initially stored in each refill cartridge 212, and the computer 106 updates the count as each item of oral solid medicine is removed. As a backup, the controller 838 can verify that the storage container 210 is empty, since the vacuum pressure will not decrease when the container probe 614 is fully lowered into the storage container 210. Therefore, if query 2014 determines that more oral solid medicine remains in the storage container 210, control advances to task 2016. However, if the last item of oral solid medicine has been removed from the storage container 210, the controller 838 in task 2015 commands the cam motor 609 to open the partition 402 of the refill cartridge 212 corresponding to the empty storage container 210. It is important that the refill cartridge 212 is not opened until the storage container 210 is empty, to avoid mixing different lots of drugs.

Task 2016 determines whether the user initially requested the station 100 to dispense more than one item of oral solid medicine, or more than one type of oral solid medicine; if so, tasks 2008, 2010, 2012, and 2014 are repeated as needed.

In task 2018, having completed the retrieval of the requested medicine, the controller 838 instructs the motor 706 to open the door 110. The user in task 2020 removes the cup 108, and manually closes the door 110. As described above, the controller 838 may close the door 110 automatically instead. The process of FIG. 20 ends in task 2022.

Figure 21:
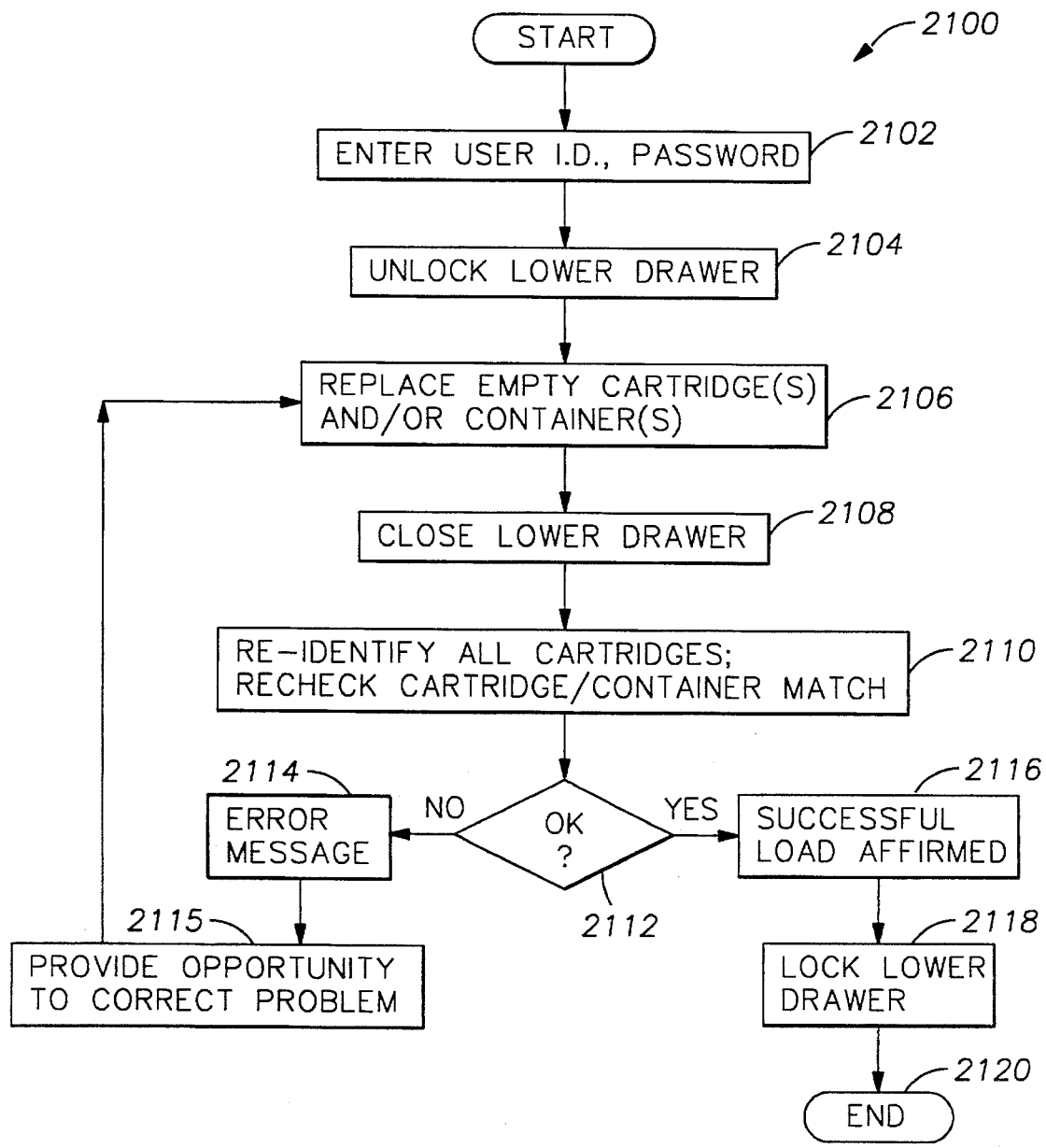
FIG. 21 is a flowchart illustrating the steps for medical personnel, such as pharmacists, to stock the dispenser 104 with medicine in accordance with one embodiment of the invention.

Another intended user of the invention is a pharmacist, laboratory technician, or another person who uses the invention to replenish the supplies of medicine stored therein. Such a user operates the invention according to a number of tasks 2100, shown in FIG. 21. In task 2102, the user identifies himself/herself to the computer 106 by entering a user ID and a unique password upon the keyboard 106b, as in task 2002 of FIG. 20. The computer 106 cross-references a stored user list to verify the user's identity, and to determine which operations the user is authorized to perform with the dispenser 104.

If the computer 106 determines that the user is authorized to access the dispenser 104, the computer 106 unlocks the lower drawer 204 in task 2104. In addition, the computer 106 stores the time and the user's name in a log stored in computer memory. In task 2106, the user may remove one or more empty refill cartridges 212 from their respective containers 210, and replace them with full refill cartridges 212. The user may also replace one or more containers 210 at this time. Then, in task 2108 the user closes the lower drawer 204.

In task 2110 the controller 838 rotates the carousel 206 in a complete circle, using the upper code reader 834 to verify the positions of the existing refill cartridges 210. During this complete circle, the controller 838 stores the locations of the newly replaced refill cartridges 210 in memory. In this way, the controller 838 maintains a map, stored in memory, of the locations of the refill cartridges 210. Also in task 2110, the controller 838 uses the code readers 728, 834 to verify that the labels of each storage container 210 and corresponding refill cartridge 212 match.

If query 2112 determines that the medicine stored in any storage container 210 does not match that stored in its corresponding refill cartridge 212, the controller 838 directs a message to the computer 106 in task 2114, causing an error message to be presented on the display 106c. In this case, the user is permitted to correct the problem by re-ordering the refill cartridges 212 or containers 210 in task 2115.

Otherwise, if the load was done properly, the computer 106 in task 2116 confirms that the loading operation was successful. After task 2116, the controller 838 locks the lower drawer 204 in task 2118, and the process ends in task 2120.

1. General Description of Envelope-Dispensing Embodiment

Figure 22:
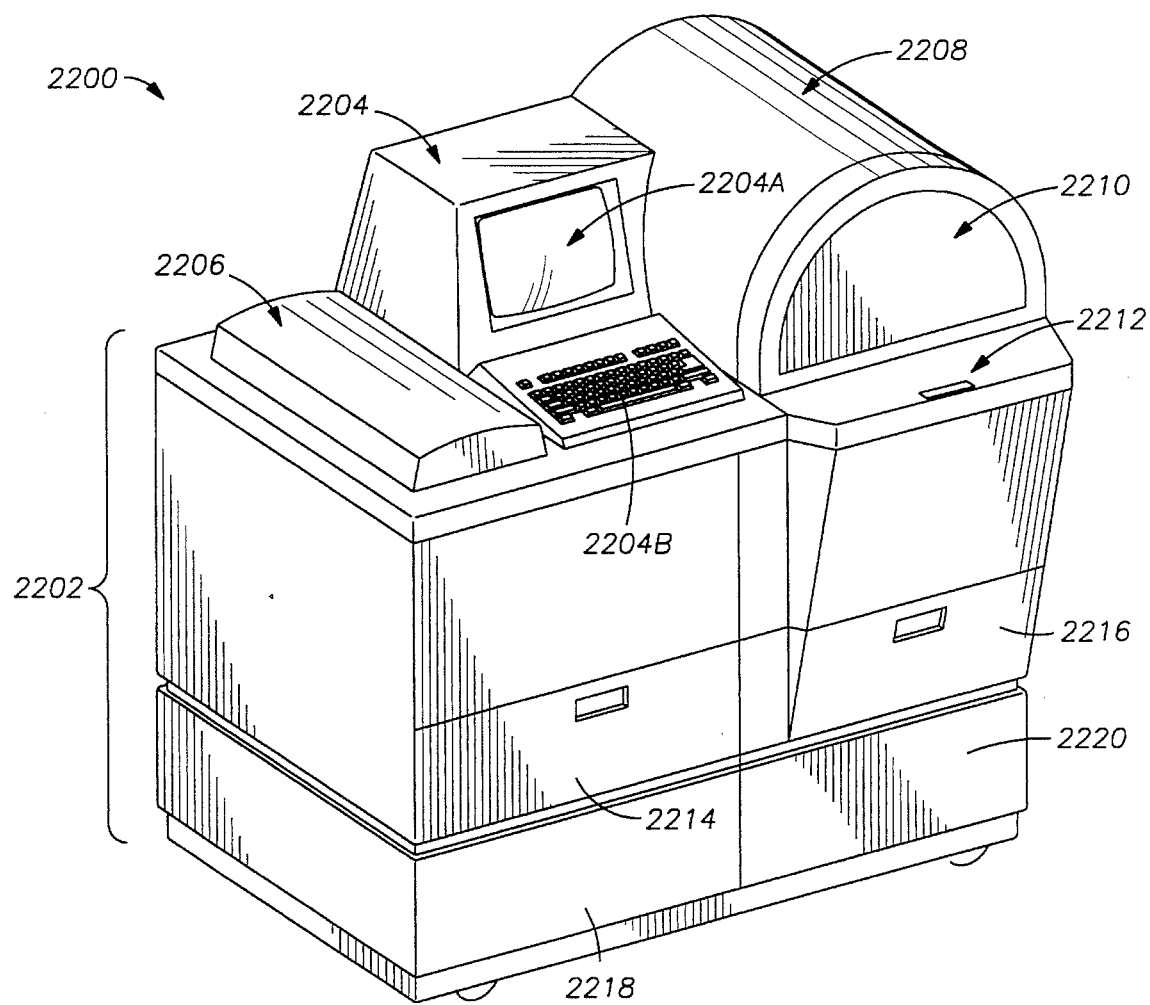
FIG. 22 is an isometric view of a medicine dispensing station 2200 of the invention.

Referring to FIGS. 22–40, an alternate embodiment of the above-described medicine dispensing station 100 will be described, beginning with FIG. 22. This embodiment will be referred to as an "envelope-dispensing" embodiment. In this embodiment, a medicine dispensing station 2200 generally includes a dispenser 2202 and a computer 2204. In an illustrative embodiment, the computer 2204 includes a display 2204a, a user input device 2204b, and a central processing unit (not shown). The computer 2204 generally performs a similar overall function as the computer 106.

In accordance with the envelope-dispensing embodiment of the invention, each user (not shown) of the invention enters data into the computer 2204 to instruct the dispenser 2202 to prepare individual "prescriptions" desired by that user. Each "prescription" includes one or more units of oral solid medication, of one or more different types or dosages of medicine. A prescription may, for example, contain all medicine to be administered to a patient at a given time. In one embodiment, the dispenser 2202 places all items corresponding to each requested prescription in a single envelope (described below). However, it is also contemplated that each envelope might contain a single item. The dispenser 2202 makes each envelope available for its requesting party in a manner described below.

More specifically, after a user's instructions are received, the dispenser 2202 removes an envelope from an envelope supply housing 2206. The envelope is then fed to a printer (described below). After the printer prints selected information on an envelope, the envelope is filled with items of medicine comprising the requested prescription. If a filled prescription is intended for scheduled administration, rather than on-request delivery, it is directed to one of several portable envelope-organizing totes (described below) contained in a tote housing 2208. Individual totes may be removed from the tote housing 2208 by opening a tote housing door 2210. Alternatively, if the user designates a prescription as "PRN" (i.e. on-request), the filled envelope is fed into a PRN bin 2212 for immediate removal.

Drawers 2214, 2216 are used to store a variety of oral solid medicines dispensed by the station 2200, pursuant to the invention. Above the drawers 2214, 2216, various equipment (not shown) is located for extracting items of medicine from storage containers (described below) and placing the items of medicine into individual envelopes. The dispenser 2202 may additionally include supply compartments 2218, 2220 to store additional supplies of medicine, equipment, or other supplies.

Figure 23:
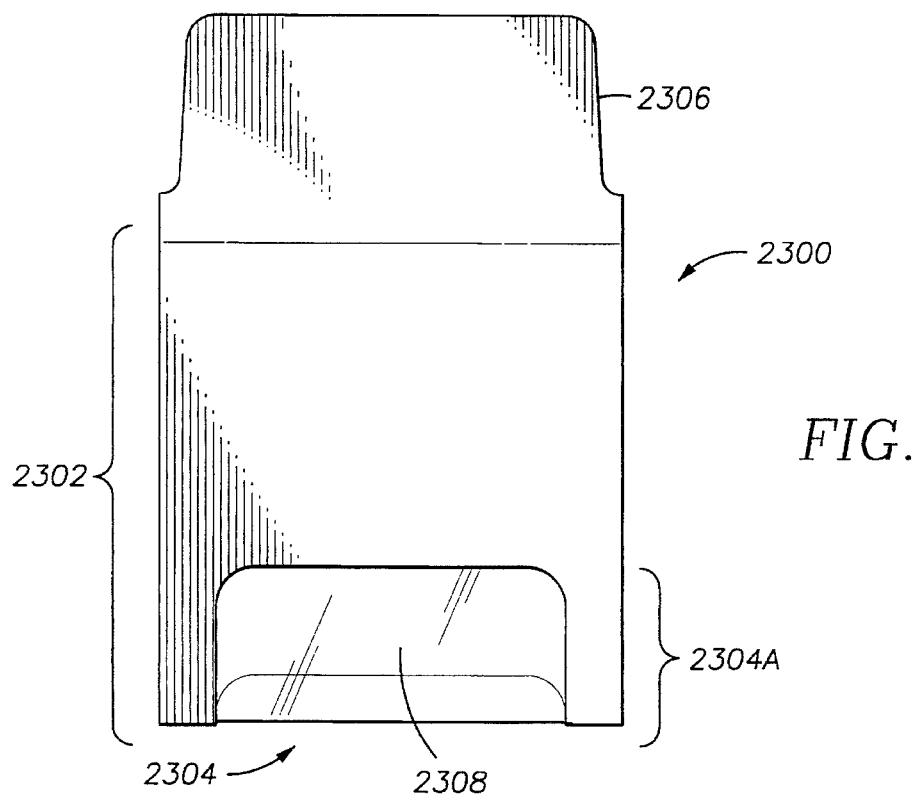
FIG. 23 is a front elevational view of an envelope 2300 for use in conjunction with the present invention, with a flap 2306 in an open position.
Figure 24:
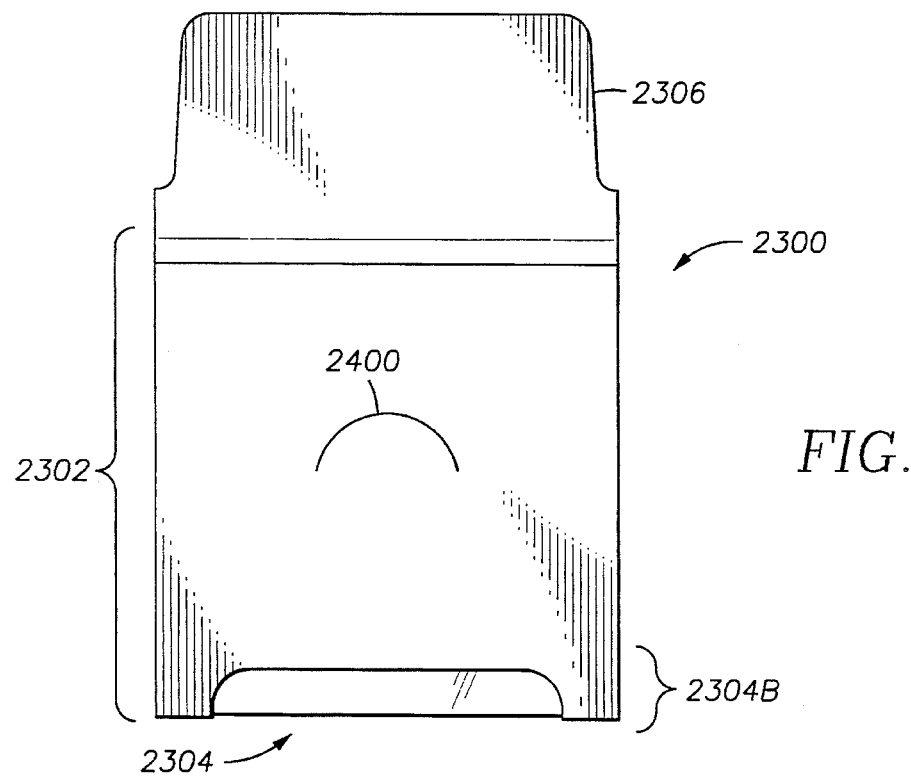
FIG. 24 is a rear elevational view of the envelope 2300, with the flap 2306 in the open position.

In an illustrative embodiment, the dispenser 2202 may use envelopes such as an exemplary envelope 2300 (FIGS. 23–24). Each envelope 2300 includes a body 2302, a window 2304, and a flap 2306. As discussed in greater detail below, the envelope 2300 may be sealed by folding the flap 2306 downward against the body 2302, and adhering the flap 2306 to the body 2302. Such a seal is preferably broken simply by separating the flap 2306 from the body 2302. Preferably, the window 2304 includes a larger front section 2304a and a smaller rear section 2304b, so that items of medicine (not shown) in the envelope 2300 may be easily seen through the front section 2304a against an inside surface 2308 of the body 2302.

A cut-out tab 2400 may be provided in the rear side of the body 2302 to hold the flap 2306 in a closed position after the seal is broken. The body 2302, flap 2306, and tab 2400 may be made of paper, for example, and the window may be manufactured from cellophane, glassine, or another suitable transparent material.

2. Detailed Description of Hardware Components and Interconnections of Envelope-Dispensing Embodiment The dispenser 2202 will now be described in greater detail, initially referencing FIGS. 25–26. The envelope supply housing 2206 contains empty, unused envelopes 2300, which are stacked against each other for ease of dispensing. In an illustrative embodiment, the envelope supply housing 2206 organizes the envelopes 2300 by stacking them in trays. However, a circular envelope supply housing (not shown) is also contemplated.

The envelopes 2300 are individually removed from the housing 2206 by a roller 2504 and a dual slide-type conveyor-belt 2506. In a preferred embodiment, the conveyor-belt 2506 may comprise two parallel continuous bands 2506a that move the envelopes 2300 against two parallel slides 2506b. The continuous bands preferably comprise PYRAMID™ or HAVASIT™ brand polyurethane cords with a diameter of about 0.125 inches, or HAVISIT™ brand flat, woven, polyurethane belts. The slides may comprise a metal, plastic, or other material with a smooth, straight edge for sliding envelopes 2300 against.

The conveyor-belt 2506 transfers envelopes 2300 to a printer 2508. The printer labels each envelope 2300 with data such as the dispensing nurse's name, the patient's name, the type of medicine, the quantity of medicine, etc. The printer 2508 preferably comprises an impact or thermal transfer printer, such as the EPSON® brand M-290 series slip printer, or the GULTON® brand TTR-200 thermal transfer printer, or another printer of suitable size and printing capability.

After printing the necessary data on an envelope 2300, the printer 2508 deposits the envelope 2300 into a pivoting chamber 2510, which feeds the envelope 2300 onto another dual slide-type conveyer-belt 2512. The relationship between the printer 2508, pivoting chamber 2510, and conveyor-belt 2512 is shown in greater detail in FIGS. 27–28. The pivoting chamber 2510 receives the envelope 2300 when in a receiving position 2700. Then, the pivoting chamber 2510 pivots to an unloading position 2800. Slots 2802 defined in the pivoting chamber 2510 permit the conveyor-belt 2512 to grasp the envelope 2300 within the pivoting chamber 2510, and urge the envelope 2300 in a direction 2804.

Figure 25:
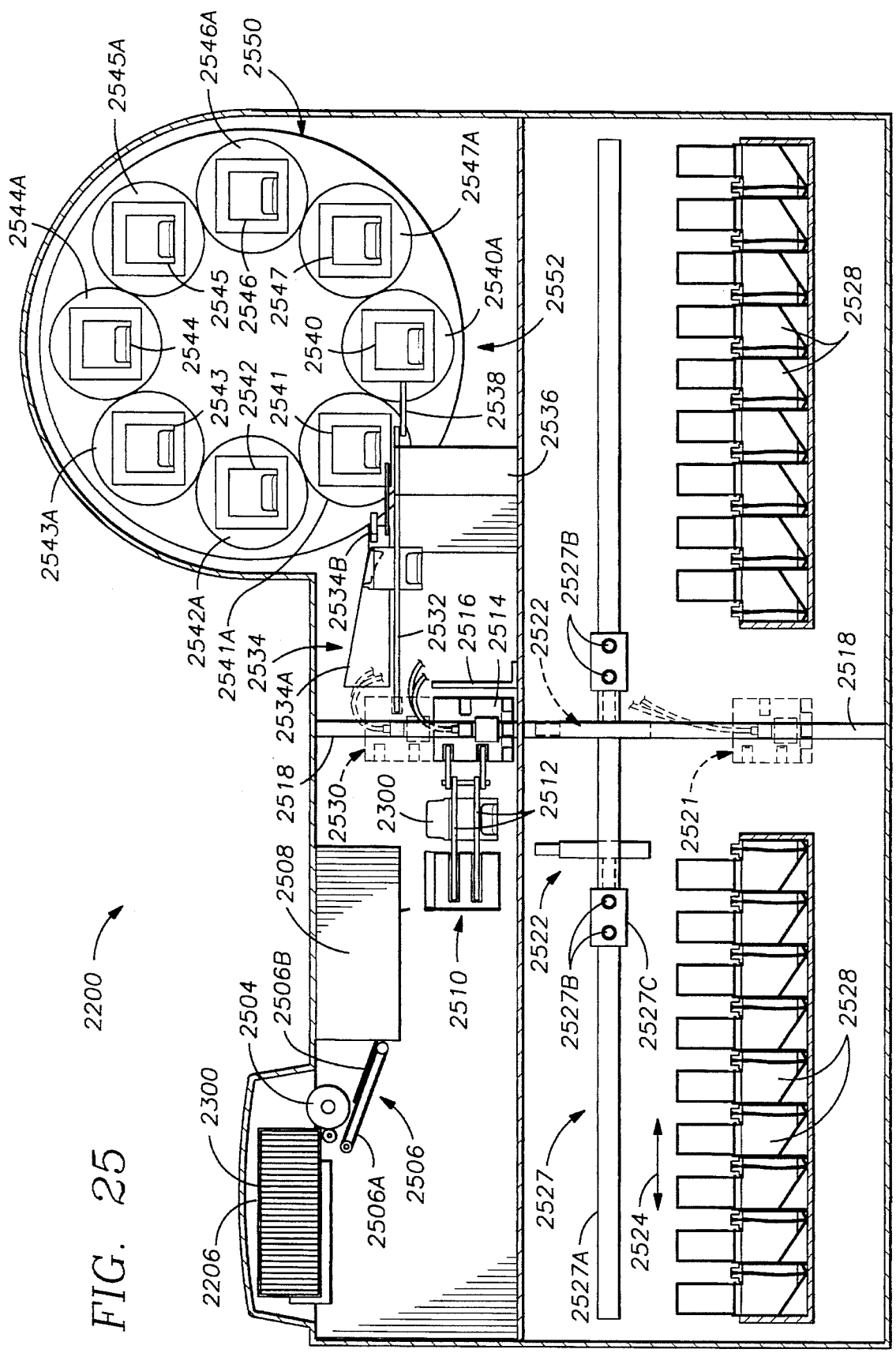
FIG. 25 is a cross-sectional front elevational view of the dispenser 2202 of the invention.
Figure 26:
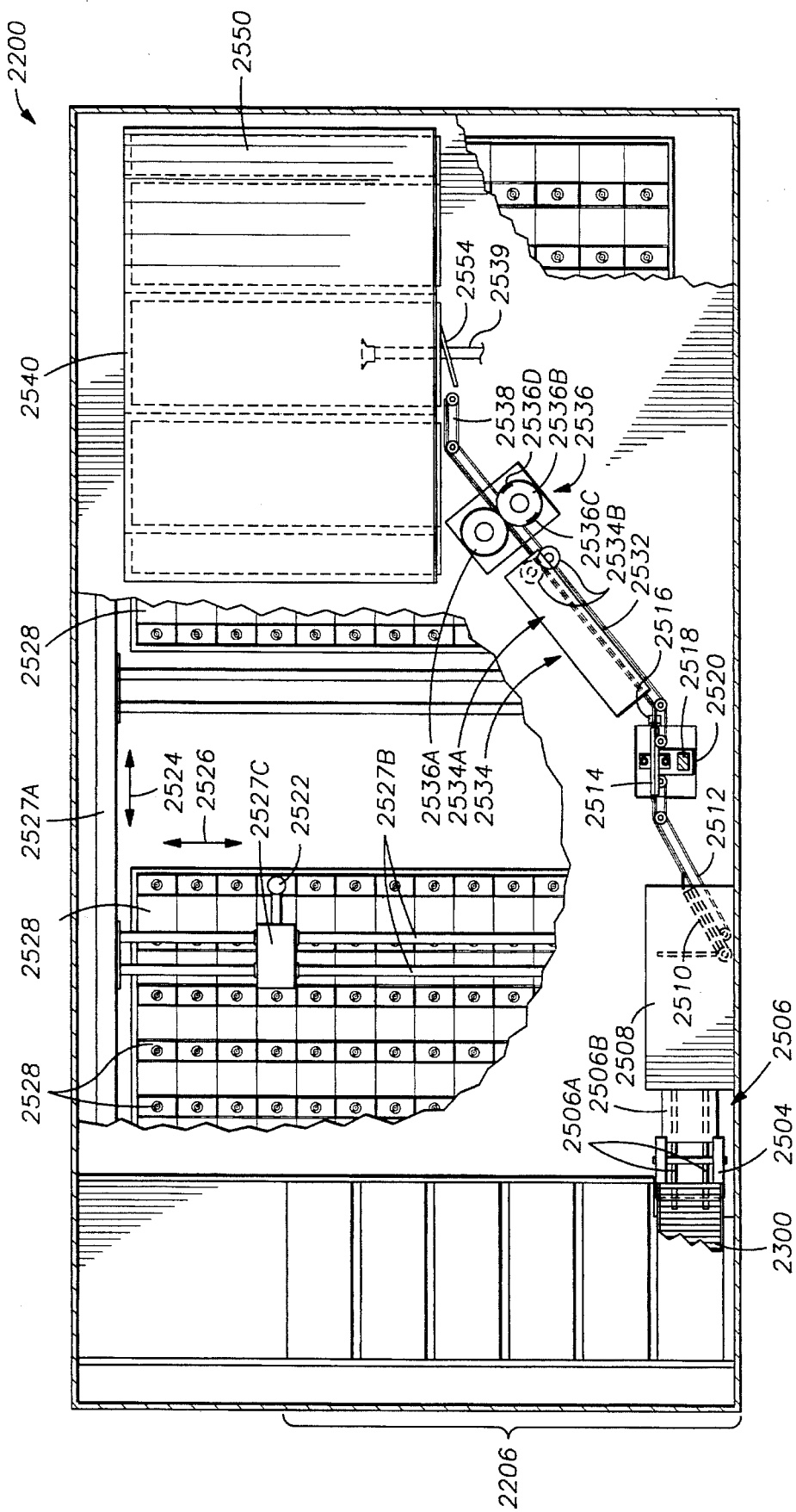
FIG. 26 is a cross-sectional top plan view of the dispenser 2202 of the invention.
Figure 27:
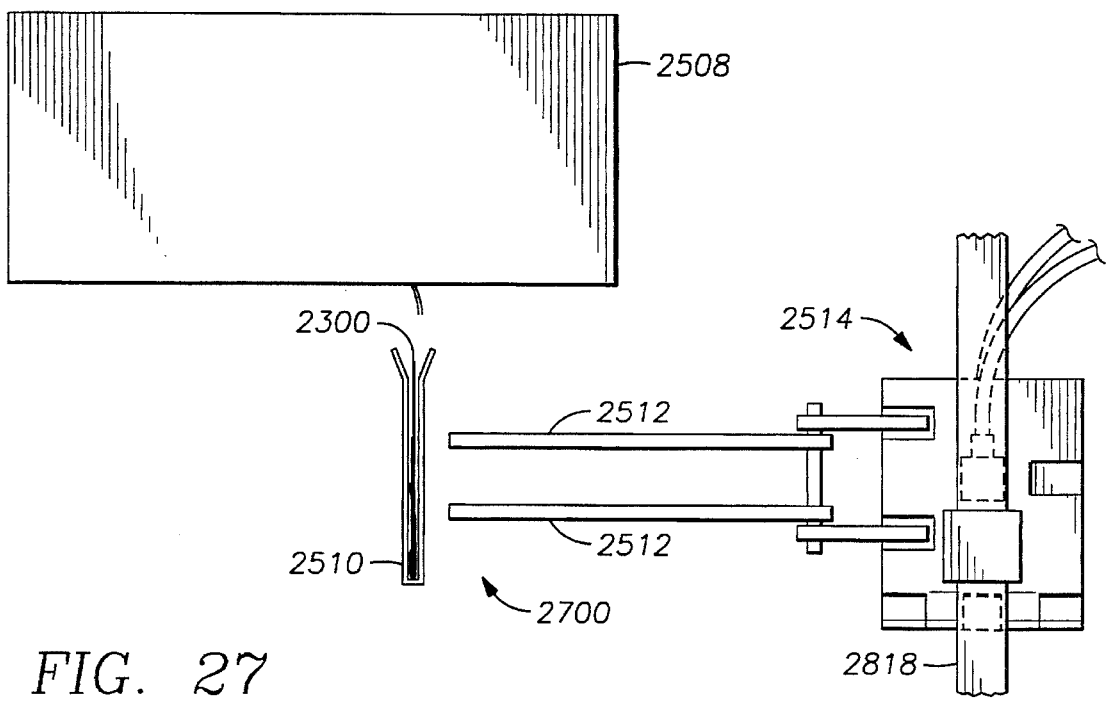
FIG. 27 is a detailed front elevational view of a printer 2508, a pivoting chamber 2510, and a conveyor belt 2512 of the invention, where the pivoting chamber 2510 is in a receiving position 2700.
Figure 28:
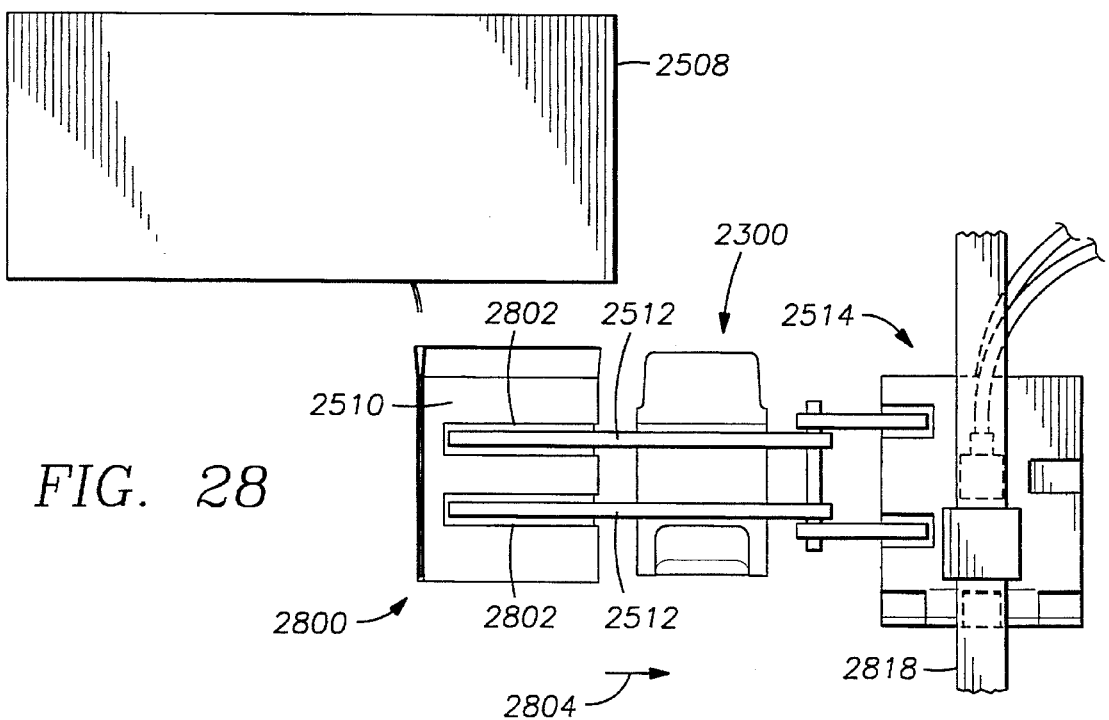
FIG. 28 is a detailed front elevational view of the printer 2508, pivoting chamber 2510, and conveyor belt 2512, where the chamber 2510 is in an unloading position 2800.

Referring to FIGS. 25–26, the conveyor-belt 2512 directs the envelope 2300 from the pivoting chamber 2510 into a sleeve 2514, through a first open end of the sleeve 2514. A stop 2516 prevents the envelope 2300 from exiting a second, opposing open end of the sleeve 2514. The stop 2516 is rigidly mounted in alignment with the conveyor-belt 2512.

The sleeve 2514 is shown in greater detail in FIGS. 29–30. The sleeve 2514 includes front and rear sides 2902, 2904 pivotably connected by a hinge 2906. The rear side 2904 has defined therein a pair of slots 2908 to permit the conveyor-belt 2512 to assist entry of the envelopes 2300 into the sleeve 2514. The front side 2902 also has defined therein a slot 2909 to assist in removing the envelope 2300 from the sleeve 2514, as discussed below. The sleeve 2514 additionally includes front and rear suction devices 2910, 2912, which are connected to the vacuum equipment 800. The suction devices 2910, 2912 preferably comprise ABOUT PACKAGING® brand suction pads with a surface area of about ⅜ inches$^2$. However, a variety of suction cups, pads, or other suitable members may be employed. Referring to FIGS. 25–26 and 29–30, the sleeve 2514 is slidably affixed to a vertical rail 2518 via a motorized carriage 2520, to facilitate upward and downward motion of the sleeve 2514. Filling an envelope 2300 with items of medicine is accomplished by first moving the sleeve 2514 downward along the rail 2518, into a loading position 2521. The sides 2902, 2904 may be urged together about the hinge 2906 to permit the suction devices 2910, 2912 to contact the envelope 2300. Then, vacuum pressure is applied to the suction devices 2910, 2912 and the sides of the envelope 2300 are separated, thereby opening the envelope 2300.

Referring to FIGS. 25–26, dual universal vacuum probes 2522 are used to obtain individual items of medicine and deposit them in the envelope 2300 while the envelope 2300 resides in the loading position 2521, in the sleeve 2514. In an illustrative embodiment, each universal vacuum probe 2522 is intended to access medicine located on the opposite side of the rail 2518 from the other probe 2522. Each universal vacuum probe 2522 is moveable about an x-direction 2524 and a y-direction 2526, to effectively access a variety of medicines stored in a plurality of storage containers 2528. For ease of organization, the storage containers 2528 are preferably arranged in a rectilinear array. Movement of the universal vacuum probes 2522 is accomplished by a positioning mechanism, which preferably comprises a precision linear positioning system 2527 similar to the ASYMTEK Automove™ 300 series system.

The linear positioning system 2527 includes a pair of parallel tracks 2527a, located at opposite ends of the dispenser 2202, and extending in the x-direction 2524. Crossbars 2527b are slidably mounted between the tracks 2527a, to facilitate movement in the x-direction 2524 along the tracks 2527a. Each universal vacuum probe 2522 is slidably connected to a crossbar carriage 2527c, so as to be movable in the y-direction 2526 along the crossbars 2527b. Each universal vacuum probe 2522 may be positioned to access a desired storage container 2528 by moving the crossbars 2527b longitudinally along the tracks 2527a, and by moving the crossbar carriage 2527c longitudinally along the crossbars 2527b between the tracks 2527a. Such movement may be carried out by stepper motors, or other well known means. Then, to access a storage container, a reciprocating motor (not shown) extends the universal vacuum probe 2522 downward and back again to retrieve a unit article stored therein.

The storage containers 2528, which are positioned beneath the linear positioning system 2527, are preferably located in the drawers 2214, 2216. In an illustrative embodiment, each drawer 2214, 2216 is sized to accommodate 108 storage containers 2528, which are placed side-by-side in a rectilinear array, with nine containers 2528 in the x-direction 2524 and twelve containers 2528 in the y-direction 2526. In an illustrative embodiment, each storage container 2528 is intended to hold a plurality of items of one type of oral solid medicine, possibly of a different type than the other storage containers 2528. The storage containers 2528 may be made from similar materials as the containers 210, described above. The construction of the containers 2528 is discussed in greater detail below.

After an envelope 2300 is filled with the desired type and dosage of medicine, the sleeve 2514 is moved upward along the rail 2518 to a unloading position 2530, which lies above the stop 2516. A slide-type conveyor-belt 2532 then contacts the envelope 2300 via the slot 2909, removes the envelope 2300 from the sleeve 2514, and directs the envelope 2300 through a flap-folder 2534. The conveyor-belt 2532 may be constructed from similar materials as the conveyor-belts 2506 and 2512. The flap-folder 2534 includes a sloping flange 2534a and a pair of pinch rollers 2534b to close the flap 2306 by folding the flap 2306 against the body 2302 and creasing the fold.

After the flap-folder 2534, the conveyor-belt 2532 directs the envelope 2300 through a closing mechanism 2536. In a preferred embodiment, the closing mechanism 2536 comprises a crimper made up of first and second gears 2536a, 2536b. Preferably, each gear 2536a, 2536b is circular, and has a circumference equal to twice the width of an envelope 2300. In an illustrative embodiment, the gears 2536a–b have a thickness of about ⅛ inch. In a preferred embodiment, the first gear 2536a is toothed around its entire circumference, and the second gear 2536b is toothed only at two opposite regions 2536c–d of its circumference.

The gears 2536a–b are mounted above the conveyor-belt 2532, so that the conveyor-belt 2532 can urge an envelope 2300 completely through the closing mechanism 2536, and so that the gears 2536a–b are aligned with the region of the envelope 2300 where crimping is desired. Furthermore, the gears 2536a–b are motor-driven, at the same speed as the conveyor-belt 2532.

The closing mechanism 2536 only crimps certain areas of the envelope 2300—namely, those areas contacted by the regions 2536c–d. In a preferred embodiment, the gears 2536a–b may be selectively operated to control which areas of the envelope 2300 are crimped. Specifically, an optical sensor (not shown) may be employed in cooperation with a mechanical clutch (not shown) to initiate gear rotation only in response to the presence of an envelope 2300 at a designated location relative to the gears 2536a–b. The optical sensor may, for example, comprise a light emitting diode, a photodiode/phototransistor, and certain detecting electronics. The relationship between the gears 2536a–b, clutch, and optical sensor may be established, in a preferred embodiment, so that only the edges of the envelope 2300 are crimped. This permits easy opening of the envelope 2300, simply by lifting the flap 2306.

In some cases, where a more sturdy seal is desired, the gear 2536b may bear teeth around its entire circumference. This would result in crimping across the full width of each envelope 2300, requiring a two-step opening: first lifting the flap 2306, then separating the front and rear sides of the envelope's body 2302.

After being processed by the closing mechanism 2536, a filled, closed, sealed envelope 2300 is directed by another conveyor-belt 2538 into an awaiting tote 2540 located in a loading position 2540 (FIG. 25). The envelope 2300 is loaded into the tote 2540 through a tote door 2554 (FIGS. 26 and 31), which is selectively opened and closed by a motorized opening/closing device (not shown), such as a robotic arm, telescoping finger, or the like. In an illustrative embodiment, a vacuum push rod 2539 then extends (FIG. 26) through the tote door 2554 to adhere to the envelope 2300 and push the envelope 2300 into the tote 2540.

An illustrative embodiment of the invention contemplates eight totes 2540–2547, housed in a rotatable carousel 2550. The carousel 2550 is selectively rotated, under control by the computer 2204, to position the totes 2540–2547 for loading and unloading. The totes 2540–2547 are housed in individual chambers 2540a–2547a defined in the carousel. Each chamber 2540a–2547a is geared to rotate in proportion to the rotation of the carousel 2550, so that each tote 2540–2547 is always maintained in an upright position.

The upper five totes 2542–2546 may be accessed by opening the tote housing door 2210. If desired, however, a blocking plate (not shown) may be mounted over the face of the carousel 2550 to prevent access to certain totes in the upper five positions (occupied by totes 2542–2546 in FIG. 25). This may be accomplished by defining an access hole in the blocking plate, to permit a user to insert and remove totes from the position occupied by the tote 2544, for example. In the illustrated example of FIG. 25, the totes 2540, 2541, and 2547 would be inaccessible to users since they are located inside the dispenser 2202. With the blocking plate installed, the computer 2204 may be used to selectively rotate the carousel 2550, thus enabling users to remove only the single, accessible tote. Alternatively, the blocking plate may be rotated in addition to or instead of the carousel 2550 to selectively provide the user with access to a specified tote. In another alternative embodiment, locks may be provided in the individual chambers 2540a–2547a to restrict access to selected ones of the totes 2540–2547.

Preferably, the totes 2540–2547 are identical, any may take the form of an exemplary tote 3100 shown in FIGS. 31–32. The exemplary tote 3100 includes a box-shaped tray 3102, with dual upper lips 3104 that may be slidably attached to grooves 3106 defined in a cover 3108. The cover 3108 is preferably made of a semi-transparent material such as plastic, LEXAN®, or an acrylic material. The cover 3108 includes a carrying handle 3110. As described above, the tote 3100 includes a tote door 2554. The door 2554 has defined therein an aperture 2555, whose purpose is described in greater detail below.

The door 2554 is preferably hinged along one side, and spring loaded toward a closed position. With this arrangement, the door 2554 may be opened by the motorized opening/closing device described above (not shown).

The tray 3102 preferably includes ribbed inner guides 3111, to assist in holding the envelopes 2300 in an upright position. Additionally, lower corners of the case may be provided with longitudinal ridges 3112 sized to slidably engage corresponding lips 3114 formed inside the cover 3108. Thus, in order to conveniently access the contents of the tray 3102, the cover 3108 may be slidably removed from above the tray 3102, and then slidably stowed beneath the tray 3102.

3. Storage Container and Refill Cartridge of the Envelope-Dispensing Embodiment The envelope-dispensing embodiment of the invention also contemplates different embodiments of the storage container 210 and the refill cartridge 212. Specifically, the envelope-dispensing embodiment employs a storage container 2528 and a refill cartridge 3302 as shown in FIGS. 33–37. Although the storage container 2528 and refill cartridge 3302 may be manufactured from similar materials as the storage container 210 and refill cartridge 212, a number of structural differences may be advantageously introduced. The storage container 2528 comprises a generally box-shaped body 3301 having defined therein a refill opening 3305 bordered by upper lips 3304 shaped to snappingly engage lower lips 3306 of the refill cartridge 3302. This fit is possible since each lip 3304, 3306 includes a raised tongue 3304a, 3306a and a recessed groove 3304b, 3306b, all of complimentary sizes.

The cartridge 3302 includes a box-shaped body 3303 with a hinged partition 3308. The partition 3308 is pivotably connected to the refill cartridge 3302 by a hinge 3310, which may comprise a rigid mechanical hinge, a flexible fabric connector, or another suitable device. Thus, the partition 3308 may pivot between a closed position (shown in solid lines in FIG. 33) and an open state (shown in phantom lines in FIG. 33).

Figure 37A:
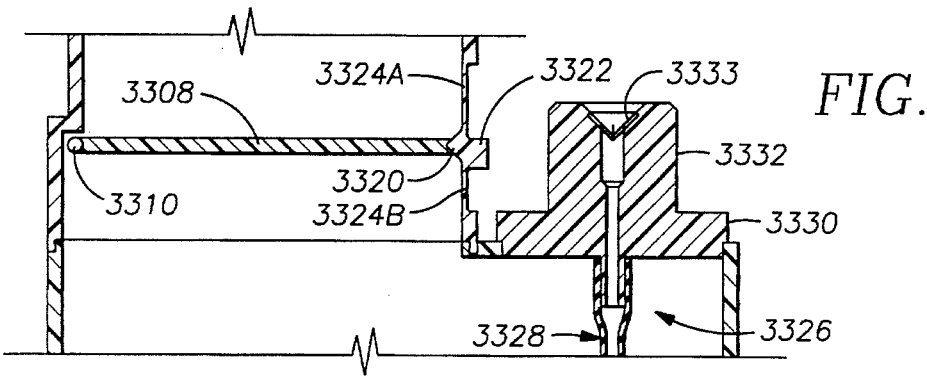
FIG. 37A is a side cross-sectional view of the refill cartridge, 3302, storage container 2528, and container probe 3326, illustrating a partition 3308 in a closed position.
Figure 37B:
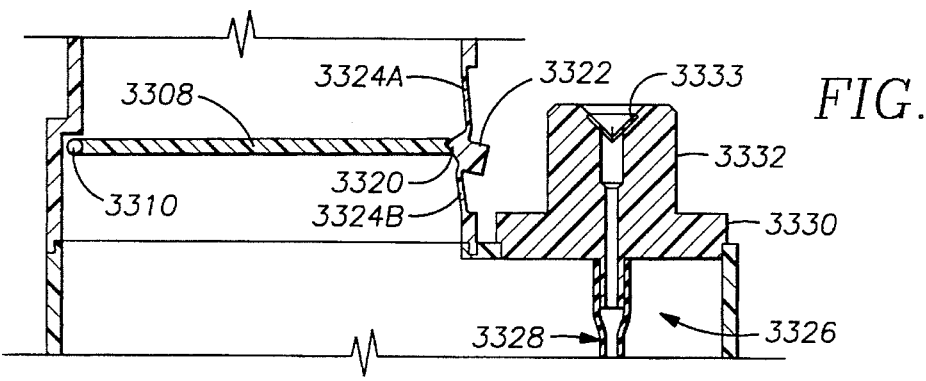
FIG. 37B is a side cross-sectional view of the refill cartridge, 3302, storage container 2528, and container probe 3326, illustrating disformation of thinned sections 3324a–b caused by downward pressure on an actuation tab 3322.

As shown more clearly in FIGS. 33 and 37A, the partition 3308 has defined therein an end groove 3316. When the partition 3308 is in the closed position, as in FIG. 37A, the end groove 3316 mates up to a retaining knob 3320 formed on an inner wall of the refill cartridge 3302. An actuation tab 3322 is formed on the outer surface of the refill cartridge 3302, opposite the retaining knob 3320. Thinned sections 3324a–b are defined adjacent to the actuation tab 3322.

Figure 37C:
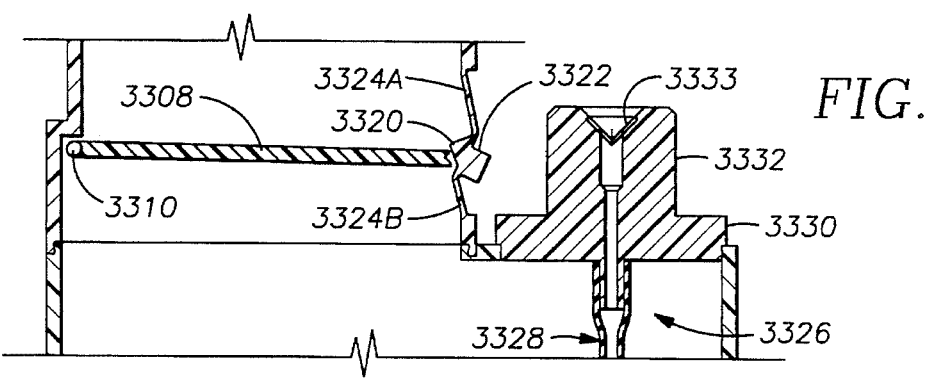
FIG. 37C is a side cross-sectional view of the refill cartridge, 3302, storage container 2528, and container probe 3326, illustrating disengagement of a retaining knob 3320 from a groove 3316 caused by continued downward pressure on the actuation tab 3322.
Figure 37D:
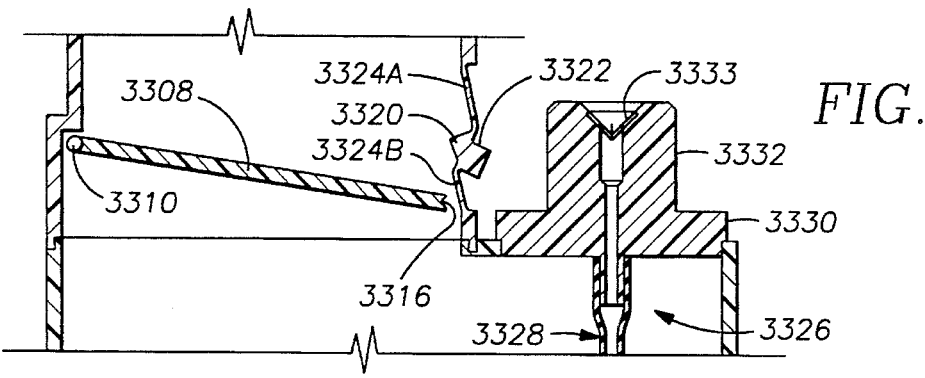
FIG. 37D is a side cross-sectional view of the refill cartridge, 3302, storage container 2528, and container probe 3326, illustrating the partition 3308 in a completely open state.

Downward pressure on the actuation tab 3322 disforms the thinned sections 3324a–b (FIG. 37B), eventually causing the retaining knob 3320 to disengage from the end groove 3316 (FIG. 37C). As a result, the partition 3308 is permitted to swing downward into an open state (FIG. 37D), permitting a supply of medicine to flow from the refill cartridge 3302 into the storage container 2528.

Referring to FIGS. 33–35 and 38, the storage container 2528 includes a container probe 3326, which includes a probe shaft 3328, a cap 3330, a head 3332, and a funnelled inner seat 3333. The probe shaft 3328 includes a probe tip 3328a. In an illustrative embodiment, the probe tip 3328a simply comprises the end of the probe shaft 3328. However, an alternate embodiment may employ an attachment to the probe shaft 3328, such as a blocking means, to prevent the probe shaft 3328 from completely sucking up any items of oral solid medicine. Although the probe shaft 3328 preferably comprises SILCON® brand reinforced silicone tubing, another suitably pliant material may be employed. Inner and outer diameters of the probe shaft 3328 are selected advantageously to provide for effective contact between the probe shaft 3328 and items of oral solid medicine, while preventing the probe 3326 from completely sucking up any of such items. For example, the outer diameter of the probe shaft 3328 may be about 0.157 inches, with the inner diameter being about 0.093 inches.

Figure 36:
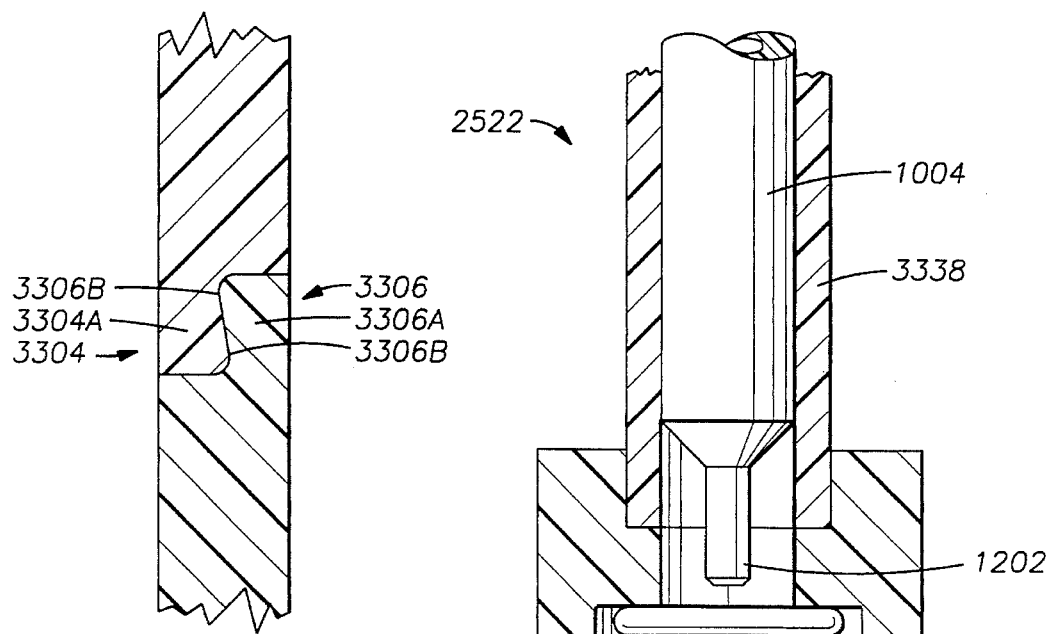
FIG. 36 is a cross-sectional side elevational view of an exemplary snap connection of the invention, such as the interface between a lower lip 3306 of the refill cartridge 3302 and an upper lip 3304 of the container 2528.
Figure 38:
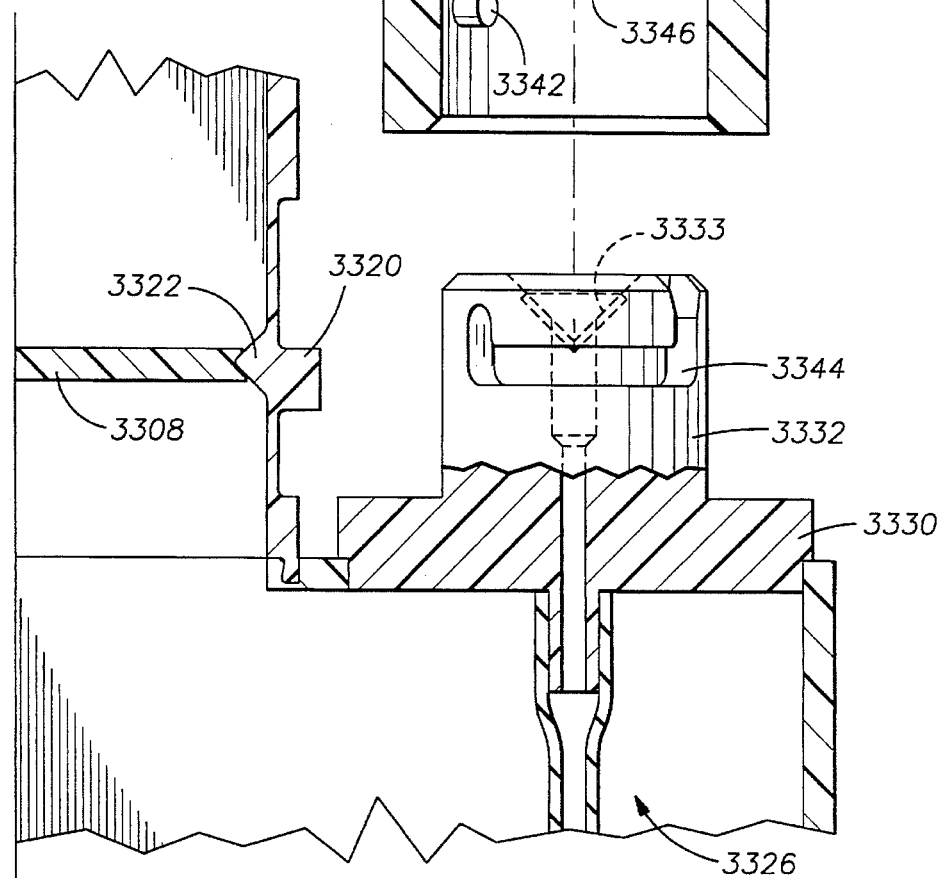
FIG. 38 is a side cross-sectional view of a universal vacuum probe 2522 and a container probe 3326 of the invention.

The cap 3330 preferably engages the container 2528 via snapping connections, such as shown in FIG. 36, thereby preventing the cap 3330 from entering the container 2528. The funneled inner seat 3333 may comprise a "duck-bill" valve or a "check valve."

In the envelope-dispensing embodiment of the invention, engagement between one of the universal vacuum probes 2522 and one of the container probes 3326 may occur differently than the engagement between the universal vacuum probe 1001 and the container probe 614. In particular, each universal vacuum probe 2522 includes a probe sheath 3338 with a socket 3340 to receive the head 3332. The inner surface of the socket 3340 includes an opposing pair of guide pins 3342 (only one shown), and the outer surface of the head 3332 has defined therein a pair of correspondingly sized opposing curved channels 3344 (only one shown). Thus, the socket 3340 and the head 3332 may be lockingly engaged by snugly pushing the socket 3340 over the head 3332, and twisting the socket 3340. A resilient member 3346 is provided to ensure that the head 3332 and the socket 3340 are maintained in a locked condition by urging the guide pins 3342 upward in the channels 3344. The resilient member 3346 may comprise, for example, a spring or a layer of elastic material. After the socket 3340 and the head 3332 are engaged, the probe nozzle 1202 may be urged into the funnelled inner seat 3333 by lowering the probe finger 1004.

4. Some Illustrative Components of the Envelope-Dispensing Embodiment Similar to the Cup-Dispensing Embodiment The envelope-dispensing embodiment may include code readers similar to those of the cup-dispensing embodiment. For example, the envelope-dispensing embodiment includes a code reader (not shown), which is slidably connected to the crossbars 2527b, along with the universal vacuum probe 2522. The code reader may comprise a bar code reader, an electrical memory reader, or another device for reading optical or electrical codes furnished by the storage containers 2528 and/or the refill cartridges 3302. In an illustrative embodiment, the refill cartridges 3302 may bear such codes on an upper surface, to facilitate access by the code reader. Likewise, the storage containers 2528 may bear such codes on an upper surface of their caps 3330, to facilitate code reader access.

In addition, the envelope-dispensing embodiment of the invention includes similar vacuum equipment (not shown) as the vacuum equipment 800 of the cup-dispensing embodiment. In an exemplary embodiment, such vacuum equipment may be stored in the drawers 2218, 2220. For ease of explanation, the vacuum equipment of the envelope-dispensing embodiment will also be referred to as the "vacuum equipment 800."

In the envelope-dispensing embodiment, the vacuum line 820 may be employed to connect the vacuum equipment 800 to the universal vacuum probe 2522. Moreover, one or more additional 3-way solenoid valves 814 may be connected to the vacuum pump 806 or additional vacuum pumps (not shown) to create suction or to blow air through vacuum lines (not shown) connected to the suction devices 2910, 2912 and the vacuum pushrod 2539.

In the envelope-dispensing embodiment, the control board 836 may be employed to manage the code readers and the controller 838 may be employed to operate the components of the dispenser 2502. The controller 838, for example, may include electronics for controlling and/or receiving signals from the linear positioning system 2527, the door of the PRN bin 2212, the tote housing door 2210, the vacuum pump 806, the detector 818, the pressure regulator 816, the control board 836, the tote doors 2554, as well as other electrical components of the invention.

Operation of Envelope-Dispensing Embodiment

Figure 39A:
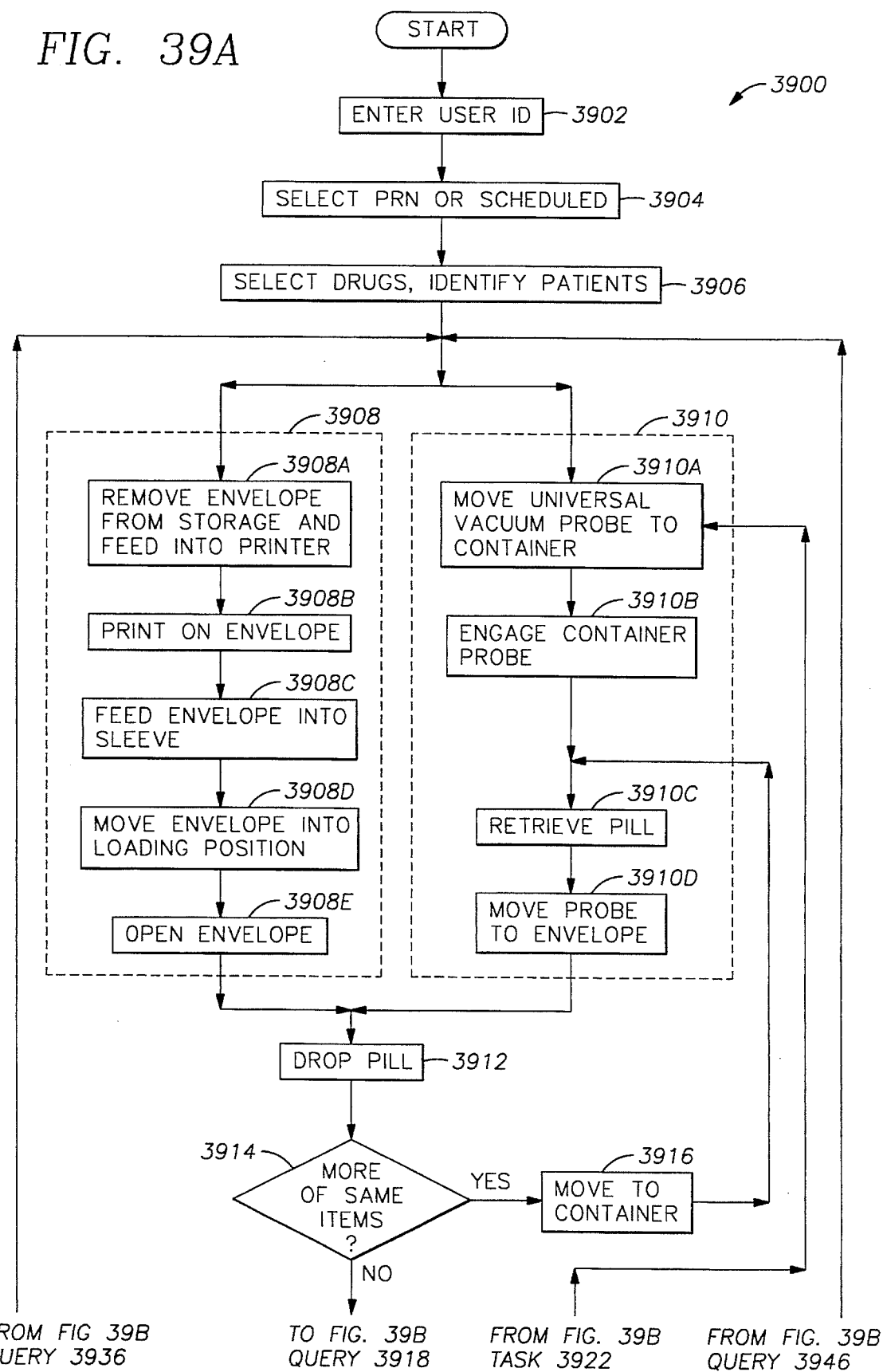
FIGS. 39A and 39B comprise a flowchart illustrating the steps for medical personnel, such as nurses, to obtain items of oral solid medicine in accordance with one embodiment of the invention.
Figure 39B:
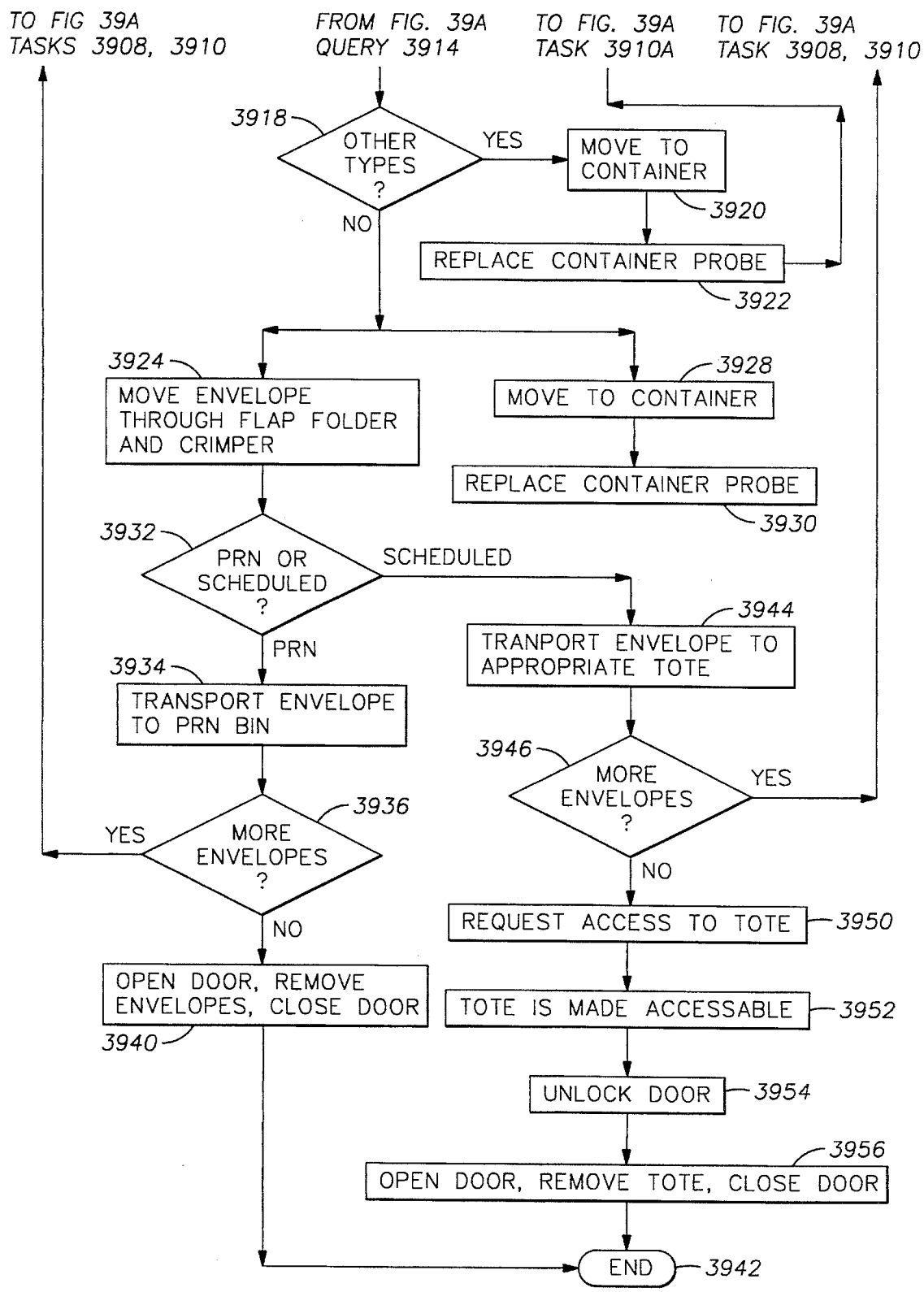
Figure 40:
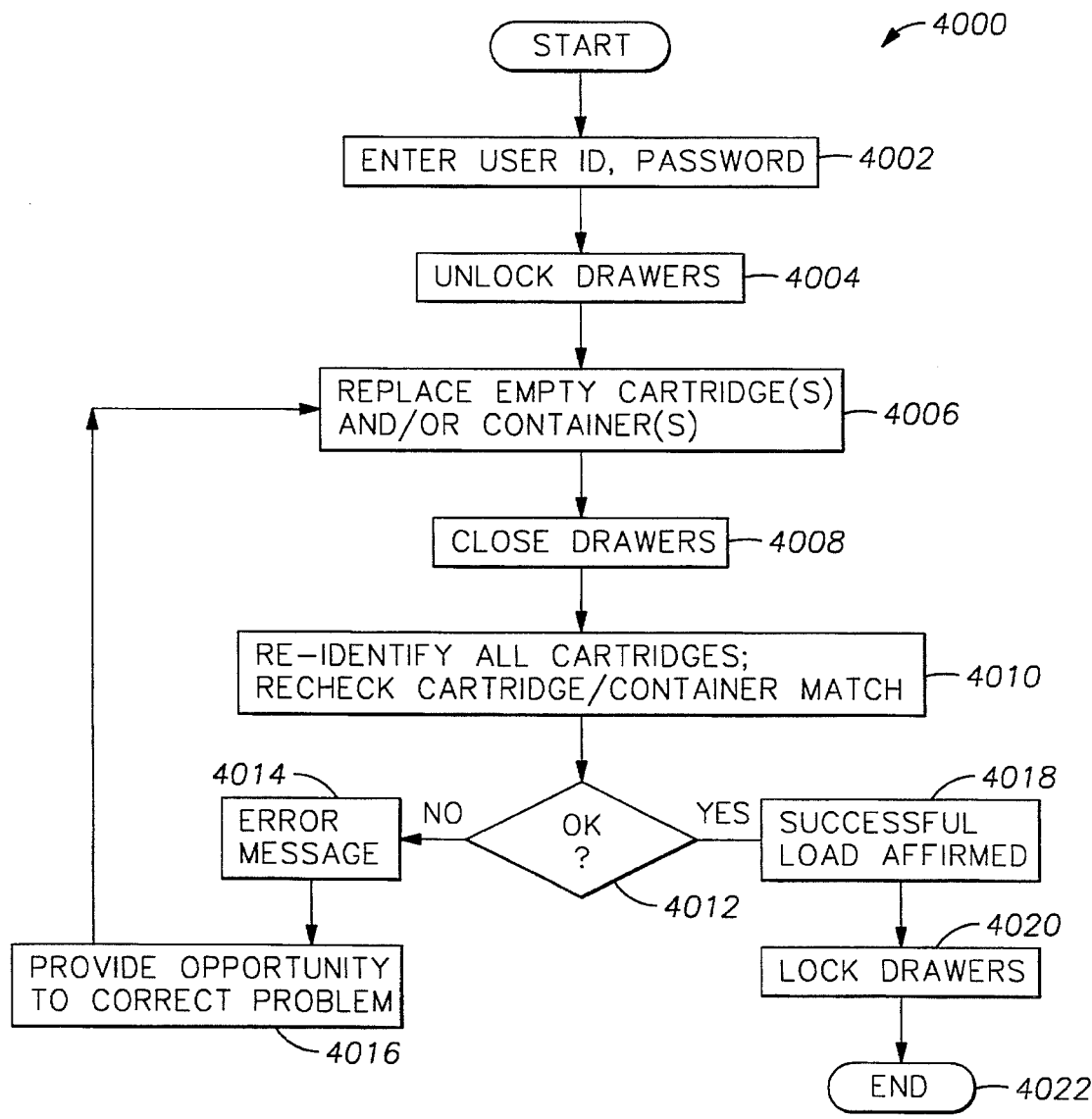
FIG. 40 is a flowchart illustrating the steps for medical personnel, such as pharmacists, to stock the dispenser 2202 with medicine in accordance with one embodiment of the invention.

Having described the hardware components and interconnections of the envelope-dispensing embodiment, an illustrative method of using this embodiment will be described. One intended user of the invention is a doctor, nurse, medical technician, or another person who uses the invention to obtain medicine from it. Such a user may operate the invention according to a number of tasks 3900, as shown in FIGS. 39A–39B. In task 3902, the user identifies himself/herself to the computer 2204. This may be accomplished by entering a user ID upon the keyboard 2204b, by presenting a magnetic card (not shown) to the computer 2204, by furnishing an electronic card (not shown) to the computer 2204, or by another suitable method. Additionally, if added security is desired, the computer 2204 may require the user to enter a unique password upon the keyboard 2204b. Next, in task 3904 the user indicates whether the medicine to be dispensed is "PRN" or "scheduled." "PRN" denotes medicine for dispensing on an "on-request" basis: these prescriptions will be packaged in an envelope 2300 and deposited in the PRN bin 2212. In contrast, "scheduled" medicine is packaged in an envelope 2300 and placed in one of the totes 2540–2547 along with other prescriptions to be routinely administered.

Next, in task 3906 the user identifies the desired drug and the patient for whom the drug is intended, again by using the keyboard 2204b. With the patient identified, the computer 2204 may cross-check the desired drug against a stored record of any of the patient's allergies, medical problems, or other concerns. In addition, this permits the computer 2204 to maintain a log of the type and quantity of drugs dispensed in each prescription package.

Next, tasks 3908 and 3910 are performed simultaneously. In task 3908, task 3908a begins by removing an envelope 2300 from the envelope supply housing 2206 and feeding the envelope 2300 into the printer 2508. The envelope 2300 is removed from the envelope supply housing 2206 and fed into the printer 2508 by the roller 2504 and the conveyer-belt 2506. Next, the printer 2508 prints data on the envelope 2300 in task 3908b. As discussed above, this data may include information concerning the patient's identity, the doctor's name, the type and dosage of medicine, etc.

After task 3908b, task 3908c feeds the envelope 2300 from the printer 2508 into the sleeve 2514. More specifically, the printer 2508 drops the envelope 2300 into the pivoting chamber 2510, which pivotably brings the envelope 2300 in contact with the conveyer-belt 2512. The conveyer-belt 2512 contacts the envelope 2300 through the slots 2802 defined in the chamber 2510. The conveyor-belt 2512 then feeds the envelope 2300 into the sleeve 2514 through an open end of the sleeve 2514. The stop 2516 prevents the envelope 2300 from exiting the opposite end of the sleeve 2514. Then, in task 3908d, the envelope 2300 is moved into the loading position 2521. This is accomplished by moving the motorized carriage 2520 downward along the rail 2518. Then, in task 3908e, the envelope 2300 is opened. Opening of the envelope 2300 is accomplished by urging the front and rear sides 2902, 2904 toward each other about the hinge 2906, applying suction to the suction devices 2910, 2912, and then separating the front and rear sides 2902, 2904.

As mentioned above, task 3910 is performed simultaneously with task 3908. Task 3910 begins in task 3910a, wherein the linear positioning system 2527 moves one of the universal vacuum probes 2522 to the storage container 2528 that holds the desired medicine. In an illustrative embodiment, each universal vacuum probe 2522 may be used to service half of the storage containers 2528, for maximum efficiency. After task 3910a, the appropriate universal vacuum probe 2522 in task 3910b engages the container probe 3326 associated with the desired storage container 2528. This is accomplished by moving the universal vacuum probe 2522 downward until the socket 3340 receives the head 3332. After each guide pin 3342 is received into its corresponding curved channel 3344, the socket 3340 is rotated to lock the guide pins 3342 into their corresponding channels 3344. In the illustrated embodiment, the socket 3340 is rotated in a clockwise direction (when viewed from above) to engage the head 3332. The resilient member 3346 ensures that the guide pins 3342 are firmly seated in the curved channels 3344, thereby preventing any inadvertent disengagement of the head 3332 from the socket 3340. With the socket 3340 and the head 3332 fully engaged, the probe finger 1004 is moved downward, causing the probe nozzle 1202 to seal against the funnelled inner seat 3333. This prevents any outside contaminants from entering the container probe 3326. Then, in task 3910c, the vacuum equipment 800 applies suction to the universal vacuum probe 2522, creating suction at the probe tip 3328a. The detector 818 is used to detect any increase in vacuum pressure from the normal pressure of about 20 inches of mercury, in the same fashion discussed above.

When a single item of oral solid medicine is present at the probe tip 3328a, task 3910d is performed. In task 3910d, the reciprocating motor lifts the universal vacuum probe 2522 and the attached container probe 3326 from the storage container 2528, and the linear positioning system 2527 moves the container probe 3326 over the open envelope 2300, which is in the loading position 2521.

In task 3912, the vacuum equipment 800 reduces or discontinues vacuum pressure in the probes 2522, 3326 to release the retrieved item of oral solid medicine from the probe tip 3328a. Under the force of gravity, the retrieved item drops into the open envelope 2300 below. Next, query 3914 determines whether additional items of medicine from the same container are to be retrieved. If so, the linear positioning system 2527 moves the container probe 3326 to the corresponding container 2528 in task 3916, and control is returned to task 3910c.

However, if query 3914 determines that no more items of the same type of medicine are required, query 3918 determines whether items of a different type of medicine are required. If so, the linear positioning system 2527 in task 3920 moves the container probe 3326 to its corresponding container 2528, and task 3922 replaces the container probe 3326 to the container 2528. Task 3922 is accomplished by lowering the universal vacuum probe 2522 and the container probe 3326 until the cap 3330 snappingly engages with the container 2528. Also in task 3922, the socket 3340 is pressed against the head 3332 and rotated to disengage the guide pins 3342 from the curved channels 3344. In the illustrated embodiment, the socket 3340 is rotated in a counter-clockwise direction (when viewed from above) to disengage the head 3332. Following disengagement, the universal vacuum probe 2522 is raised, freeing it completely from the container probe 3326. Following task 3922, control is passed to task 3910a.

When a "NO" answer to query 3918 is received, the motorized carriage 2520 is used in task 3924 to move the sleeve 2514 and envelope 2300 upward, and into alignment with the conveyor belt 2532. Also in task 3924, the conveyor-belt 2532 advances the envelope 2300 through the flap-folder 2534 and the closing mechanism 2536. The sloping flange 2534a folds the flap 2306 downward, and the pinch rollers 2534b crease the flap 2306 against the body 2302. Then, the first and second gears 2536a–b crimp the envelope 2300. Specifically, since the second gear 2536b is toothed only at opposite regions 2536c–d of its circumference, only edge areas of the envelope 2300 are crimped. The operation of the gears 2536a–b is selectively activated by the optical sensor. Simultaneous with task 3924, tasks 3928 and 3930 replace the container probe 3326 to its respective storage container 2528, in the same fashion as tasks 3920 and 3922.

After task 3924, query 3932 determines whether the current run is a "PRN" or a "scheduled run". For PRN runs, task 3934 transports the envelope 2300 to the PRN bin 2212. The PRN bin 2212, for example, may be conveniently located beneath the conveyor-belt 2538, so that the envelope 2300 may be easily dropped into the PRN bin 2212 after crimping. After task 3934, query 3936 determines whether there are more prescriptions to process. If so, control is returned to tasks 3908 and 3910. Otherwise, the user in task 3940 removes one or more PRN envelopes, and re-closes the PRN bin. Then, the routine ends in task 3942.

However, if query 3932 determines that the current run is a scheduled run, task 3944 transports the filled envelope 2300 to the tote at the position 2552. In the case of the tote 2540, for example, this is accomplished by the push rod 2539 adhering to the envelope 2300 through the aperture 2555 in the tote door 2554, and pushing the envelope 2300 into the tote 2540. Then, the envelope 2300 is retained in the tote 2540 by the ribbed inner guides 3111.

After task 3944, query 3946 asks whether there are more envelopes to prepare for the tote 2540. If so, control is returned to tasks 3908 and 3910. Otherwise, the user may identify him/herself to the computer 2204 in task 3950 to obtain his/her respective tote(s) 2540–2547. This may require entry of a user ID or other information to adequately identify the user. Next, task 3952 makes the requested tote accessible, if necessary, by rotating the carousel 2550 appropriately. As described above, user access to the totes 2540–2547 may instead be restricted by individual locks provided in the chambers 2540a–2547a, or by a rotatable or stationary blocking plate. After task 3952, task 3954 unlocks the tote housing door 2210. Then, in task 3956, the user opens the tote housing door 2210, removes the desired tote, and re-closes the door 2210. After task 3956, the routine ends in task 3942.

Another intended user of the invention is a pharmacist, laboratory technician, or another person who uses the invention to replenish the supplies of medicine stored therein. Such a user operates the invention according to a number of tasks 4000, shown in FIG. 40. In task 4002, the user identifies him/herself to the computer 2204 by entering a user ID and a unique password upon the keyboard 2204b, as in task 3902 of FIG. 39A. The computer 2204 cross-references a stored user list to verify the user's identity, and to determine which operations the user is authorized to perform with the dispenser 2502.

If the computer 2204 determines that the user is authorized to access the dispenser 2502, the computer 2204 unlocks the drawers 2214, 2216 in task 4004. In addition, the computer 2204 stores the time and the user's name in a log stored in computer memory. In task 4006, the user may remove one or more empty refill cartridges 3302 from their respective containers 2528, and replace them with full refill cartridges 3302. The user may also replace one or more containers 2528 at this time. Then, in task 4008, the user closes the drawers 2214, 2216.

In task 4010, the linear positioning system 2527 sequentially advances the code reader over each of the storage containers 2528, and their corresponding refill cartridges to verify the positions of the existing refill cartridges 3302. During this process, the controller 838 stores the locations of the newly replaced refill cartridges 3302 in memory. In this way, the controller 838 maintains a map, stored in memory, of the locations of the refill cartridges 3302. Also in task 4010, the controller 838 uses the code reader to verify that the labels of each storage container 2528 and its corresponding refill cartridge 3302 match.

If query 4012 determines that the medicine stored in any storage container 2528 does not match that stored in its corresponding-refill cartridge 3302, the controller 838 directs a message to the computer 2204 in task 4014, causing an error message to be presented on the display 2204a. In this case, the user is permitted to correct the problem by re-ordering the refill cartridges 3302 or containers 2528 in task 4016.

Otherwise, if the load was done properly, the computer 2204 in task 4018 confirms that the loading operation was successful. After task 4018, the controller 838 locks the drawers 2214, 2216 in task 4020, and the process ends in task 4022.

Conclusion

The present invention provides its users with a number of advantages. For instance, unlike prior machines, the container probes of the invention can remove items of oral solid medicine individually from bulk storage, avoiding the need for "unit dose" packages, and facilitating convenient monitoring of the number of items dispensed. Moreover, since each medicine is assigned its own container probe, and since each storage container is sealed to its container probe, the possibility of cross contamination is minimized. Furthermore, due to the modular design of the containers and refill cartridges, the dispenser of the invention may be easily re-stocked.

Also, the invention provides a supply of medicine at nursing stations, reducing the need for nurses or pharmacy personnel to travel between the nursing station and the pharmacy repeatedly to acquire medicine. The invention is also beneficial since it manages the storage, dispensing, and control of medicine.

Another benefit of the present invention is that it is inexpensive, and its parts and movements are uncomplicated in comparison to prior systems. For example, the invention operates without requiring complicated vision systems.

The invention also improves medicine management, since the controller and code readers ensure that the type, amount, and location of each different medicine is known. Also, the computer may monitor the expiration dates of the medicines, make a record of the date and amount of medicine used, and monitor the amount of medicine left in each storage container to provide messages for replacing the refill cartridges. Moreover, these tasks are made easier, since code readers are provided to enable the controller to automatically recognize the positions of the storage containers even if the storage containers are initially stored in a more or less random arrangement. Furthermore, since the dispensing of medicine with the invention is computer-managed, the invention may provide inventory lists, dispensing histories, and other useful reports. The computer may also use such inventory lists and dispensing histories to predict future drug usage, and suggest when the refill cartridges should be replaced.

In addition, the invention reduces or eliminates pilfering, lost charges, mistaken drugs, or other potential abuses that would be permitted under an "honor system," since the dispenser may be locked, as discussed above.

Moreover, the envelope-dispensing embodiment of the invention is beneficial since multiple prescriptions corresponding to one nurse are routed into one or more specific totes 2540–2547 assigned to that nurse, yet each prescription is conveniently placed into its own envelope 2300 to separate it from other prescriptions. A further advantage is that each envelope 2300 is uniquely identified by a printed label, which is automatically provided by the printer 2508. The envelope-dispensing embodiment is also advantageous since it facilitates "PRN" runs as well as "scheduled" runs.

While there have been shown what are presently considered to be preferred embodiments of the invention, it will be apparent to those skilled in the art that various changes and modifications can be made herein without departing from the scope of the invention as defined by the appended claims. For example, the computer may be connected to a hospital or pharmacy information system to access patient files, doctor or pharmacist authorizations, or other supporting data regarding the requested medicine.

Moreover, although the detector 818 was described above as being a pressure transducer, an embodiment where the detector 818 comprises an airflow meter is also contemplated. In this case, the presence of a single item of oral solid medicine at the probe tip 617 is indicated by a certain magnitude of airflow, or by a change in airflow.

In another embodiment, the rack and pinion assembly 1100 of the cup-dispensing embodiment may be replaced with a hydraulic, pneumatic, or other suitable system for raising and lowering the container probe 614. Furthermore, if a more snug fit is desired between the storage container 216 and the container probe 614 of the cup-dispensing embodiment of the invention, a number of vertical channels (not shown) may be defined in the inside of the curved surface 300 facilitate airflow into the storage container 210 while medicine is being retrieved, and thereby ensure unrestricted air flow through the probe tip 617.

What is claimed is:

1. An oral solids medicine storage apparatus for use in an automatic medicine dispensing machine, comprising:

a storage container including a floor configured to channel oral solids to a retrieval location within the storage container from which the solids can be retrieved;

a container probe having a probe tip, wherein the container probe is selectively advanceable into the storage container to permit the probe tip to contact an item of oral solids; and a refill cartridge engageable with the storage container to permit one or more items of oral solids contained in the refill cartridge to be selectively advanced into the storage container for retrieval by the container probe.

2. The apparatus of claim 1, wherein the refill cartridge is positioned such that one or more items of oral solid medicine contained in the refill cartridge may be selectively advanced into the retrieval location by gravity.

3. The apparatus of claim 1, wherein the refill cartridge includes a moveable partition to permit items of oral solids to advance from the refill cartridge into the storage container.

4. The apparatus of claim 1, wherein the refill cartridge comprises:

a body to store items of oral solids, said body including one or more lower lips for sealingly engaging with a storage container;

a partition having an end groove defined therein;

a retaining knob formed on an inner surface of the refill cartridge so as to be adjacent to the end groove when the partition is in a closed position; and wherein the body of the refill cartridge includes an actuation tab formed on its outer surface proximate the retaining knob, and wherein the body includes one or more thinned sections adjacent to the actuation tab such that application of pressure to the actuation tab disforms the thinned sections to advance the partition from its closed position into an opened state to selectively advance one or more items of oral solids from the body into the storage container for retrieval by the container probe.

5. The apparatus of claim 1, wherein the refill cartridge comprises:

a body to store items of oral solids; and a partition including a protruding flange, wherein application of pressure to the flange pivots the partition from a closed position into an opened state that selectively advances one or more items of oral solids from the body into the storage container for retrieval by the container probe.

* * * * *